US012483843B2

(12) United States Patent
Sturgeon et al.

(10) Patent No.: US 12,483,843 B2
(45) Date of Patent: Nov. 25, 2025

(54) CONTEXT-BASED SITUATIONAL AWARENESS FOR HEARING INSTRUMENTS

(71) Applicant: Starkey Laboratories, Inc., Eden Prairie, MN (US)

(72) Inventors: Brantly Sturgeon, Burnsville, MN (US); Krishna Vastare, Eden Prairie, MN (US); Gal Davidson, Gan Yavne (IL); Jingjing Xu, Eden Prairie, MN (US); Majd Srour, San Jose, CA (US); Nitzan Bornstein, Tel Aviv (IL); Matan Sivan, Tel Aviv (IL)

(73) Assignee: Starkey Laboratories, Inc., Eden Prairie, MN (US)

( * ) Notice: Subject to any disclaimer, the term of this patent is extended or adjusted under 35 U.S.C. 154(b) by 202 days.

(21) Appl. No.: 18/330,106

(22) Filed: Jun. 6, 2023

(65) Prior Publication Data

US 2023/0396941 A1 Dec. 7, 2023

Related U.S. Application Data

(60) Provisional application No. 63/368,853, filed on Jul. 19, 2022, provisional application No. 63/365,977, filed on Jun. 7, 2022.

(51) Int. Cl.
*H04R 25/00* (2006.01)

(52) U.S. Cl.
CPC ....... *H04R 25/507* (2013.01); *H04R 2225/39* (2013.01); *H04R 2225/41* (2013.01)

(58) Field of Classification Search
CPC ............ H04R 2460/07; H04R 2225/39; H04R 2225/41; H04R 2460/01; H04R 2225/55;
(Continued)

(56) References Cited

U.S. PATENT DOCUMENTS

| | | | |
|---|---|---|---|
| 7,458,080 | B2 | 11/2008 | Parker et al. |
| 7,660,426 | B2 | 2/2010 | Hannibal et al. |

(Continued)

FOREIGN PATENT DOCUMENTS

| | | | |
|---|---|---|---|
| EP | 2908550 | B1 | 8/2015 |
| EP | 4171060 | A1 | 4/2023 |

(Continued)

OTHER PUBLICATIONS

Extended Search Report from counterpart European Application No. 23178005.7 dated Oct. 26, 2023, 6 pp.

(Continued)

*Primary Examiner* — Norman Yu
(74) *Attorney, Agent, or Firm* — Shumaker & Sieffert, P.A.

(57) ABSTRACT

One or more processing circuits may obtain context information associated with a user of one or more hearing instruments, wherein the context information is based on a first set of sensor data generated by a plurality of sensors of the one or more hearing instruments and a second set of sensor data generated by a plurality of sensors of a computing device communicatively coupled to the one or more hearing instruments. The one or more processing circuits may determine, based on at least a portion of the context information, an auditory intent of the user for a given auditory context. The one or more processing circuits may associate the auditory intent with one or more actions, such as actions to adjust one or more settings of the one or more hearing instruments. The one or more processing circuits may invoke the one or more actions associated with the auditory intent.

18 Claims, 8 Drawing Sheets

(58) Field of Classification Search
CPC ........ H04R 25/00; H04R 1/1083; H04R 1/10; H04R 25/507; H04R 25/30; H04R 25/558; H04R 25/305
USPC ..... 381/74, 314, 56, 312, 104, 23.1, 303, 58
See application file for complete search history.

(56) References Cited

U.S. PATENT DOCUMENTS

| | | | | |
|---|---|---|---|---|
| 8,839,273 | B2 | 9/2014 | Parker et al. | |
| 9,596,551 | B2 | 3/2017 | Pedersen et al. | |
| 9,603,123 | B1 | 3/2017 | Jackson et al. | |
| 9,808,404 | B2 | 11/2017 | Nolan et al. | |
| 9,860,653 | B2 | 1/2018 | Olsen et al. | |
| 9,891,963 | B2 | 2/2018 | Parker et al. | |
| 10,051,109 | B2 | 8/2018 | Jackson et al. | |
| 10,491,741 | B2 | 11/2019 | Jackson et al. | |
| 10,609,207 | B2 | 3/2020 | Jackson et al. | |
| 10,755,717 | B2 | 8/2020 | Werner et al. | |
| 10,764,226 | B2 | 9/2020 | Goldstein | |
| 10,897,641 | B2 | 1/2021 | Ott et al. | |
| 11,638,563 | B2 | 5/2023 | Burwinkel et al. | |
| 2006/0222194 | A1 | 10/2006 | Bramslow et al. | |
| 2013/0316744 | A1 | 11/2013 | Newham et al. | |
| 2014/0128032 | A1 | 5/2014 | Muthukumar | |
| 2016/0309266 | A1 | 10/2016 | Olsen et al. | |
| 2018/0070155 | A1 | 3/2018 | Negi et al. | |
| 2018/0176885 | A1 | 6/2018 | Vanblon et al. | |
| 2018/0228404 | A1 | 8/2018 | Bhunia et al. | |
| 2018/0233018 | A1 | 8/2018 | Burwinkel et al. | |
| 2018/0343338 | A1 | 11/2018 | Prasad et al. | |
| 2019/0228766 | A1 | 7/2019 | White et al. | |
| 2019/0246216 | A1 | 8/2019 | Frederiksen et al. | |
| 2019/0253812 | A1 | 8/2019 | Gallégo | |
| 2020/0066264 | A1 * | 2/2020 | Kwatra | G10L 25/63 |
| 2020/0160277 | A1 | 5/2020 | Weldemariam et al. | |
| 2020/0245938 | A1 | 8/2020 | Xu et al. | |
| 2022/0070585 | A1 | 3/2022 | Chen et al. | |
| 2022/0100590 | A1 | 3/2022 | Chalmers et al. | |
| 2022/0224789 | A1 | 7/2022 | Abdollahian et al. | |
| 2023/0041690 | A1 | 2/2023 | Huang | |
| 2023/0164475 | A1 * | 5/2023 | Chen | H04R 1/1041 381/74 |
| 2023/0251712 | A1 | 8/2023 | Fortin et al. | |
| 2023/0404490 | A1 | 12/2023 | Burwinkel et al. | |

FOREIGN PATENT DOCUMENTS

| | | | |
|---|---|---|---|
| WO | 2010049543 | A2 | 5/2010 |
| WO | 2012149955 | A1 | 8/2012 |
| WO | 2016102416 | A1 | 6/2016 |
| WO | 2019143499 | A1 | 7/2019 |
| WO | 2021108425 | A1 | 6/2021 |
| WO | 2022002110 | A1 | 1/2022 |
| WO | WO 2022002110 | * | 1/2022 |
| WO | 2023283569 | A1 | 1/2023 |

OTHER PUBLICATIONS

Response to Extended Search Report dated Dec. 18, 2023, from counterpart European Application No. 23178005.7 filed Jun. 13, 2024, 108 pp.

"Contextual System Event Trigger", Tizen Docs, Retrieved from: https://docs.tizen.org/application/native/guides/alarm/trigger/, Accessed on: Jan. 12, 2022, 12 pp.

"Widex Moment™ delivers pure, undistorted, natural sound. So you can better connect with the world around you.", Widex, Retrieved from: https://www.widex.com/en-us/hearing-aids/moment/, Accessed on: Mar. 24, 2021, 33 pp.

Guiry et al., "Multi-Sensor Fusion for Enhanced Contextual Awareness of Everyday Activities with Ubiquitous Devices", Sensors, Mar. 21, 2014, 15 pp.

Townend et al., "Real-life Applications of Machine Learning in Hearing Aids", Hearing Review, Mar. 26, 2018, 10 pp.

Wang et al., "Context Recognition for Adaptive Hearing-Aids", 2015 IEEE 13th International Conference on Industrial Informatics (INDIN), Jul. 22, 2015, pp. 1102-1107.

Zhang et al., "Context-aware Event Type Identification Based on Context Fusion and Joint Learning", 2020 IEEE Fifth International Conference on Data Science in Cyberspace (DSC), Jul. 27, 2020, pp. 105-112.

Communication pursuant to Article 94(3) EPC from counterpart European Application No. 23178005.7 dated Jul. 15, 2025, 4 pp.

* cited by examiner

700

702

| | | | | | | | | | | |
|---|---|---|---|---|---|---|---|---|---|---|
| TIME 704A | 8:00 | 8:01 | 8:02 | 8:03 | 8:04 | 8:05 | 8:06 | 8:07 | 8:08 | 8:09 |
| ACTIVITY 704B | SIT | SIT | SIT | WALK | WALK | SIT | SIT | SIT | WALK | CAR |
| AEC 704C | QUIET | - | SPN | NOISE | NOISE | SPN | SPN | SPN | NOISE | STREAM MUSIC |
| STREAMING 704D | NO | - | NO | NO | NO | NO | NO | NO | NO | YES |
| PHONE CALL 704E | NO | YES | NO | NO | NO | NO | NO | NO | NO | NO |
| OVD 704F | - | - | EV | - | - | OV+EV | OV+EV | OV+EV | - | - |
| SPL 704G | 45 | 66 | 62 | 78 | 80 | 55 | 57 | 67 | 77 | 77 |
| HEART RATE 704H | 74 | 79 | 76 | 82 | 85 | 78 | 77 | 77 | 75 | 76 |
| USER ACTION 704I | - | UI VC +++ | UI VC --- | ODAT 3 | MUTE | VC ++ | UI VC MAX | ODAT | - | MOBILE STREAM |

FIG. 7

CONTEXT-BASED SITUATIONAL AWARENESS FOR HEARING INSTRUMENTS

This application claims the benefit of U.S. Provisional Patent Application 63/365,977, filed Jun. 7, 2022, and U.S. Provisional Patent Application 63/368,853, filed Jul. 19, 2022, the entire content of each of which is incorporated by reference.

TECHNICAL FIELD

This disclosure relates to hearing instruments.

BACKGROUND

Hearing instruments are devices designed to be worn on, in, or near one or more of a user's ears. Common types of hearing instruments include hearing assistance devices (e.g., "hearing aids"), earbuds, headphones, hearables, cochlear implants, and so on. In some examples, a hearing instrument may be implanted or integrated into to a user. Some hearing instruments include additional features beyond just environmental sound-amplification. For example, some modern hearing instruments include advanced audio processing for improved functionality, controlling and programming the hearing instruments, wireless communication with external devices including other hearing instruments (e.g., for streaming media), and so on.

SUMMARY

This disclosure describes techniques for determining, for a user that wears one or more hearing instruments, an auditory intent of the user for a given auditory context and to associate the auditory intent with one or more actions that may be dynamically invoked to set the one or more hearing instruments in a configuration corresponding to the intent. The user's intent for a given auditory context is referred to herein as "auditory intent" or "hearing intent."

For example, a plurality of sensors of one or more hearing instruments and/or a computing device that is communicatively coupled to the one or more hearing instruments may produce sensor data that may indicate various information associated with the user. A processing system may obtain (e.g., receive or generate) context information based on the sensor data produced by the plurality of sensors, such as the acoustic environment that the user is in, the user's activity state, time and location of the user, the user's physiological status, and the like. In some examples, the processing system may obtain context information based on application data produced by one or more application modules of the computing device.

Based on the context information, the processing system may determine an auditory intent of the user based on the context information. For example, the processing system may apply of a machine learning model to determine an auditory intent of the user based on the context information. For instance, the processing system may determine, based on the context information, that the auditory intent of the user is to be able to intelligibly listen to a conversation with another person in a noisy environment (e.g., auditory intent of conversational listening), to reduce noise or distractions in a noisy environment (e.g., auditory intent of comfort), or the like.

The processing system may associate the auditory intent with one or more actions, such as actions to adjust one or more settings of the hearing instruments. The processing system may dynamically invoke (or notify the user to invoke) the actions associated with an auditory intent when the processing system determines that the user has the auditory intent. For instance, the processing system may perform actions to adjust one or more settings the one or more hearing instruments to a configuration corresponding to the auditory intent of the user. For example, in response to determining the user's auditory intent is conversational listening, the processing system may perform one or more actions to adjust the volume of the one or more hearing instruments, activate noise cancelation, instruct one or more hearing instruments to implement a spatial filtering mode, etc. In this way, the processing system may invoke the one or more actions when the user is in the same or similar auditory context for the user (e.g., same location and time, acoustic environment, activity state and position, etc.).

In some examples, the processing system may receive feedback on the auditory intent and/or one or more actions associated with the auditory intent to retrain the machine learning model to improve on the determination of the auditory intent and/or the association of one or more actions with the auditory intent.

In one example, this disclosure describes a method comprising: obtaining, by one or more processing circuits, context information associated with a user of one or more hearing instruments, wherein the context information is based on a first set of sensor data generated by a plurality of sensors of the one or more hearing instruments and a second set of sensor data generated by a plurality of sensors of a computing device communicatively coupled to the one or more hearing instruments; determining, by the one or more processing circuits and based on at least a portion of the context information, an auditory intent of the user for a given auditory context; associating, by the one or more processing circuits, the auditory intent with one or more actions; and invoking, by the one or more processing circuits, the one or more actions associated with the auditory intent.

In another example, this disclosure describes a system comprising: memory; and one or more processing circuits operably coupled to the memory and configured to: obtain context information associated with a user of one or more hearing instruments, wherein the context information is based on a first set of sensor data generated by a plurality of sensors of the one or more hearing instruments and a second set of sensor data generated by a plurality of sensors of a computing device communicatively coupled to the one or more hearing instruments; determine, based on at least a portion of the context information, an auditory intent of the user for a given auditory context; associate the auditory intent with one or more actions; and invoke the one or more actions associated with the auditory intent.

In another example, this disclosure describes an apparatus comprising: means for obtaining context information associated with a user of one or more hearing instruments, wherein the context information is a first set of sensor data generated by a plurality of sensors of the one or more hearing instruments and a second set of sensor data generated by a plurality of sensors of a computing device communicatively coupled to the one or more hearing instruments; means for determining, based on at least a portion of the context information, an auditory intent of the user for a given auditory context; means for associating the auditory intent with one or more actions; and means for invoking the one or more actions associated with the auditory intent.

In another example, this disclosure describes a non-transitory computer-readable medium comprising instructions that, when executed, cause one or more processors to: obtain context information associated with a user of one or more hearing instruments, wherein the context information is based on a first set of sensor data generated by a plurality of sensors of the one or more hearing instruments and a second set of sensor data generated by a plurality of sensors of a computing device communicatively coupled to the one or more hearing instruments; determine, based on at least a portion of the sensor data, an auditory intent of the user for a given auditory context; associate the auditory intent with one or more actions; and invoke the one or more actions associated with the auditory intent.

The details of one or more aspects of the disclosure are set forth in the accompanying drawings and the description below. Other features, objects, and advantages of the techniques described in this disclosure will be apparent from the description, drawings, and claims.

BRIEF DESCRIPTION OF DRAWINGS

FIG. 7 is an example table containing context information and system response history, in accordance with the techniques of this disclosure.

DETAILED DESCRIPTION

Figure 1:
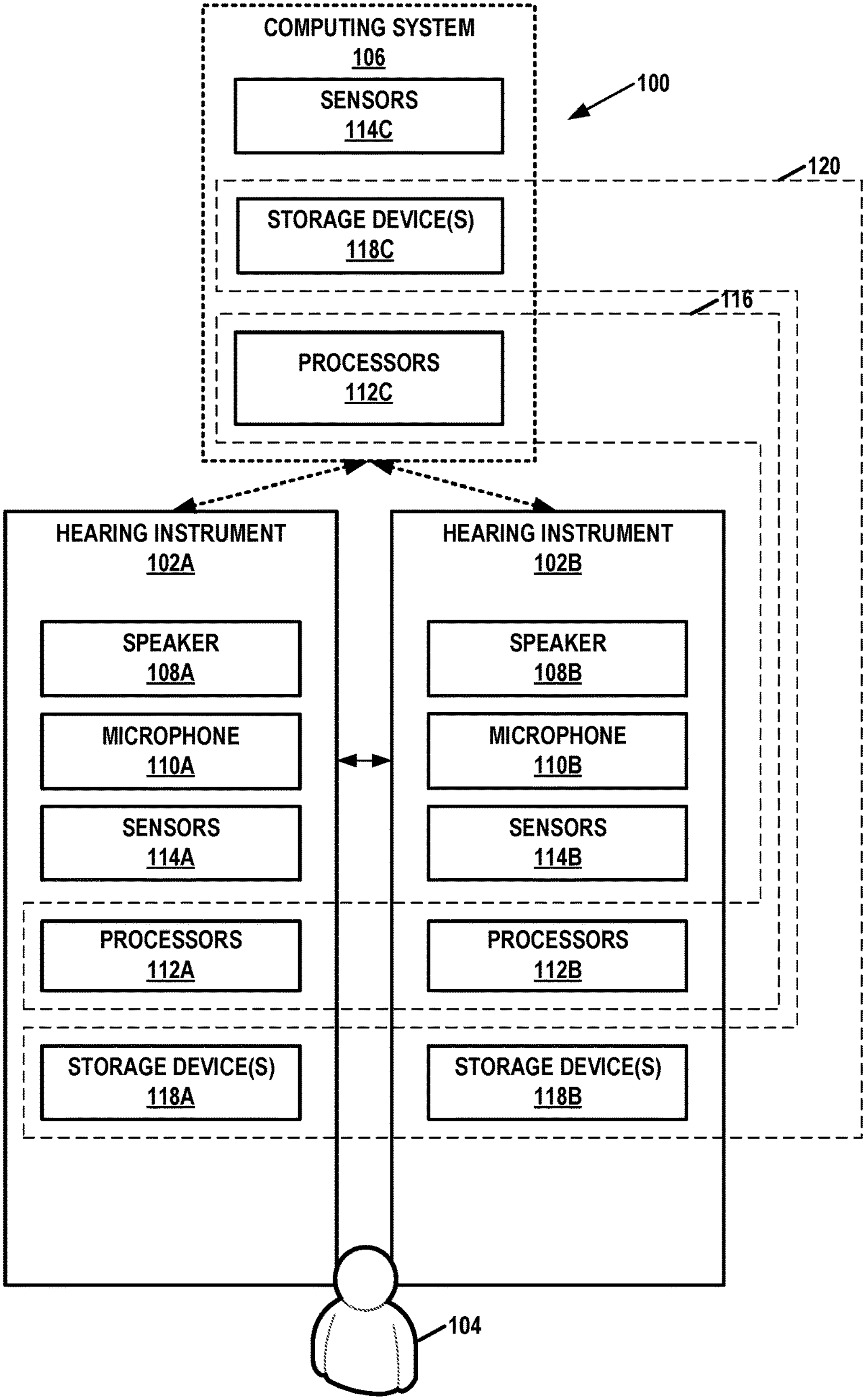
FIG. 1 is a conceptual diagram illustrating an example system that includes one or more hearing instruments, in accordance with one or more techniques of this disclosure.

In general, one or more aspects of the present disclosure describe techniques for determining the auditory intent of a user that wears one or more hearing instruments and associating the auditory intent with one or more actions that may be dynamically invoked. Such actions may adjust settings of the one or more hearing instruments to a configuration corresponding to the auditory intent.

For example, a user may have different auditory intentions depending on an auditory context of the user. For example, an auditory context of the user may include the user engaging in a conversation with another person at a particular location with a noisy environment. In this example, the user's auditory intent for the given auditory context is to intelligibly listen to the other person while reducing noise from the noisy environment (otherwise referred to herein as an auditory intent of "conversational listening"). As another example, an auditory context of the user may include the user reading a book at a particular location with a noisy environment and the user's auditory intent for this given auditory context is to reduce noise and/or notifications (otherwise referred to herein as an auditory intent of "comfort"). In each auditory context, the user may adjust one or more settings of the one or more hearing instruments to set the hearing instruments in a configuration corresponding to the user's auditory intent or perform other actions. For example, a user that is engaged in a conversation with another person in a noisy environment may increase the volume and/or adjust other settings on the one or more hearing instruments (e.g., noise cancelation) to enable the user to intelligibly listen to the other person, or a user that is reading in a noisy environment may activate a mute setting and/or adjust other settings on the one or more hearing instruments to minimize noise and/or distractions (e.g., turning off notifications). In each of the auditory contexts, the user is typically required to manually adjust the settings of the hearing instruments each time the user is in the same or similar auditory context. In some examples, the user may manually adjust settings on the one or more hearing instruments that may be less than optimal for the acoustic environment.

One or more aspects of the present disclosure describe techniques for determining an auditory intent of a user for a given auditory context based on context information of the user and associating the given auditory context with one or more actions that may be dynamically invoked, such as actions to set the one or more hearing instruments to a configuration corresponding to the auditory intent. For example, a processing system may include one or more processors of one or more hearing instruments and/or a computing device (e.g., a user's smart phone) communicatively coupled to the hearing instruments. The processing system may obtain context information based on sensor data produced by a plurality of sensors of the one or more hearing instruments and/or the computing device, application data produced by one or more applications executed on the computing device, processed sensor data, actions performed by the user (e.g., adjustment of one or more settings of the hearing instruments), user personalization data, and/or other information associated with the user. The context information may include values of one or more context parameters that provide information about the context of the user. The processing system may determine an auditory intent of the user for a given auditory context based on at least a portion of the context information. For instance, the processing system may apply a machine learning model to at least a portion of the context information to determine the auditory intent of the user for a given auditory context. The processing system may associate the auditory intent with one or more actions to adjust one or more settings of the hearing instruments that may be dynamically invoked (or notify the user to invoke) to set the one or more hearing instruments to a configuration corresponding to the auditory intent of the user.

The techniques of this disclosure may provide one or more technical advantages. For example, by determining the user's auditory context from the context information associated with the user, the one or more hearing instruments may proactively adjust one or more settings to set the one or more hearing instruments to a configuration corresponding to the auditory intent without manual intervention, thus providing the user with a seamless auditory experience.

FIG. 1 is a conceptual diagram illustrating an example system 100 that includes hearing instruments 102A, 102B, in accordance with one or more techniques of this disclosure. This disclosure may refer to hearing instruments 102A and 102B collectively, as "hearing instruments 102." A user 104 may wear hearing instruments 102. In some instances, user 104 may wear a single hearing instrument. In other instances, user 104 may wear two hearing instruments, with one hearing instrument for each ear of user 104.

Hearing instruments 102 may include one or more of various types of devices that are configured to provide auditory stimuli to user 104 and that are designed for wear and/or implantation at, on, or near an ear of user 104. Hearing instruments 102 may be worn, at least partially, in the ear canal or concha. One or more of hearing instruments 102 may include behind the ear (BTE) components that are worn behind the ears of user 104. In some examples, hearing instruments 102 include devices that are at least partially implanted into or integrated with the skull of user 104. In some examples, one or more of hearing instruments 102 provides auditory stimuli to user 104 via a bone conduction pathway.

In any of the examples of this disclosure, each of hearing instruments 102 may include a hearing assistance device. Hearing assistance devices include devices that help user 104 hear sounds in the environment of user 104. Example types of hearing assistance devices may include hearing aid devices, Personal Sound Amplification Products (PSAPs), cochlear implant systems (which may include cochlear implant magnets, cochlear implant transducers, and cochlear implant processors), bone-anchored or osseointegrated hearing aids, and so on. In some examples, hearing instruments 102 are over-the-counter, direct-to-consumer, or prescription devices. Furthermore, in some examples, hearing instruments 102 include devices that provide auditory stimuli to user 104 that correspond to artificial sounds or sounds that are not naturally in the environment of user 104, such as recorded music, computer-generated sounds, or other types of sounds. For instance, hearing instruments 102 may include so-called "hearables," earbuds, earphones, or other types of devices that are worn on or near the ears of user 104. Some types of hearing instruments provide auditory stimuli to user 104 corresponding to sounds from environment of user 104 and also artificial sounds.

In some examples, one or more of hearing instruments 102 includes a housing or shell that is designed to be worn in the ear for both aesthetic and functional reasons and encloses the electronic components of the hearing instrument. Such hearing instruments may be referred to as in-the-ear (ITE), in-the-canal (ITC), completely-in-the-canal (CIC), or invisible-in-the-canal (IIC) devices. In some examples, one or more of hearing instruments 102 may be behind-the-ear (BTE) devices, which include a housing worn behind the ear that contains all of the electronic components of the hearing instrument, including the receiver (e.g., a speaker). The receiver conducts sound to an earbud inside the ear via an audio tube. In some examples, one or more of hearing instruments 102 are receiver-in-canal (RIC) hearing-assistance devices, which include housings worn behind the ears that contains electronic components and housings worn in the ear canals that contains receivers.

Hearing instruments 102 may implement a variety of features that help user 104 hear better. For example, hearing instruments 102 may amplify the intensity of incoming sound, amplify the intensity of certain frequencies of the incoming sound, translate or compress frequencies of the incoming sound, and/or perform other functions to improve the hearing of user 104. In some examples, hearing instruments 102 implement a directional processing mode in which hearing instruments 102 selectively amplify sound originating from a particular direction (e.g., to the front of user 104) while potentially fully or partially canceling sound originating from other directions. In other words, a directional processing mode may selectively attenuate off-axis unwanted sounds. The directional processing mode may help user 104 understand conversations occurring in crowds or other noisy environments. In some examples, hearing instruments 102 use beamforming or directional processing cues to implement or augment directional processing modes.

In some examples, hearing instruments 102 reduce noise by canceling out or attenuating certain frequencies. Furthermore, in some examples, hearing instruments 102 may help user 104 enjoy audio media, such as music or sound components of visual media, by outputting sound based on audio data wirelessly transmitted to hearing instruments 102.

Hearing instruments 102 may be configured to communicate with each other. For instance, in any of the examples of this disclosure, hearing instruments 102 may communicate with each other using one or more wireless communication technologies. Example types of wireless communication technology include Near-Field Magnetic Induction (NFMI) technology, 900 MHz technology, BLUETOOTH™ technology, WI-FI™ technology, audible sound signals, ultrasonic communication technology, infrared communication technology, inductive communication technology, or other types of communication that do not rely on wires to transmit signals between devices. In some examples, hearing instruments 102 use a 2.4 GHz frequency band for wireless communication. In examples of this disclosure, hearing instruments 102 may communicate with each other via non-wireless communication links, such as via one or more cables, direct electrical contacts, and so on.

As shown in the example of FIG. 1, system 100 may also include a computing system 106. In other examples, system 100 does not include computing system 106. Computing system 106 includes one or more computing devices, each of which may include one or more processors. For instance, computing system 106 may include one or more mobile devices (e.g., smartphones, tablet computers, etc.), server devices, personal computer devices, handheld devices, wireless access points, smart speaker devices, smart televisions, medical alarm devices, smart key fobs, smartwatches, motion or presence sensor devices, wearable devices, smart displays, screen-enhanced smart speakers, wireless routers, wireless communication hubs, prosthetic devices, mobility devices, special-purpose devices, accessory devices, and/or other types of devices. Accessory devices may include devices that are configured specifically for use with hearing instruments 102. Example types of accessory devices may include charging cases for hearing instruments 102, storage cases for hearing instruments 102, media streamer devices, phone streamer devices, external microphone devices, remote controls for hearing instruments 102, and other types of devices specifically designed for use with hearing instruments 102.

Actions described in this disclosure as being performed by computing system 106 may be performed by one or more of the computing devices of computing system 106. One or more of hearing instruments 102 may communicate with computing system 106 using wireless or non-wireless communication links. For instance, hearing instruments 102 may communicate with computing system 106 using any of the example types of communication technologies described elsewhere in this disclosure.

In the example of FIG. 1, hearing instrument 102A includes a speaker 108A, a microphone 110A, a set of one or more processors 112A, sensors 114A, and one or more storage devices 118A. Hearing instrument 102B includes a speaker 108B, a microphone 110B, a set of one or more processors 112B, sensors 114B, and one or more storage devices 118B. This disclosure may refer to speaker 108A and speaker 108B collectively as "speakers 108." This disclosure may refer to microphone 110A and microphone 110B collectively as "microphones 110." Computing system 106 includes a set of one or more processors 112C, sensors 114C, and one or more storage devices 118C. This disclosure may refer to storage devices 118A, storage devices 118B, and storage devices 118C as "storage devices 118." Processors 112C and sensors 114C may each be distributed among one or more devices of computing system 106. This disclosure may refer to processors 112A, 112B, and 112C collectively as "processors 112." Processors 112 may be implemented in circuitry and may include microprocessors, application-specific integrated circuits, digital signal processors, or other types of circuits.

This disclosure may refer to sensors 114A, 114B, and 114C collectively as "sensors 114." Sensors 114 may include one or more input components that obtain physical position, movement, and/or location information of hearing instruments 102 and computing system 106 that indicates the activity of user 104, environmental information of the surrounding environment of user 104, physiological information of user 104, or any data associated with user 104. For example, sensors 114 may include one or more inertial measurement units (IMUs) that includes one or more accelerometers, gyroscopes, magnetometers, and the like. In some examples, sensors 114 may also include one or more location sensors, such as one or more satellite-based radionavigation system sensors, such as a global positioning system (GPS) sensor. In some examples, sensors 114 also include one or more magnetic sensors, telecoils, heart rate sensors, electroencephalogram (EEG) sensors photoplethysmography (PPG) sensors, temperature sensors, or any other sensors for sensing physiological data of user 104. In some examples, sensors 114 include microphones such as microphones 110A and 110B.

Hearing instruments 102A, 102B, and computing system 106 may be configured to communicate with one another. Accordingly, processors 112 may be configured to operate together as a processing system 116. Thus, discussion in this disclosure of actions performed by processing system 116 may be performed by one or more processors in one or more of hearing instrument 102A, hearing instrument 102B, or computing system 106, either separately or in coordination. Moreover, in some examples, processing system 116 does not include each of processors 112A, 112B, or 112C. For instance, processing system 116 may be limited to processors 112A and not processors 112B or 112C. Similarly, storage devices 118 may be configured to operate together as a storage system 120. Thus, discussion in this disclosure of data stored by storage system 120 may apply to data stored in storage devices 118 of one or more of hearing instrument 102A, hearing instrument 102B, or computing system 106, either separately or in coordination. Moreover, in some examples, storage system 120 does not include each of storage devices 118A, 118B, or 118C. For instance, storage system 118 may be limited to storage devices 118C and not storage devices 118A or 118B.

Figure 2:
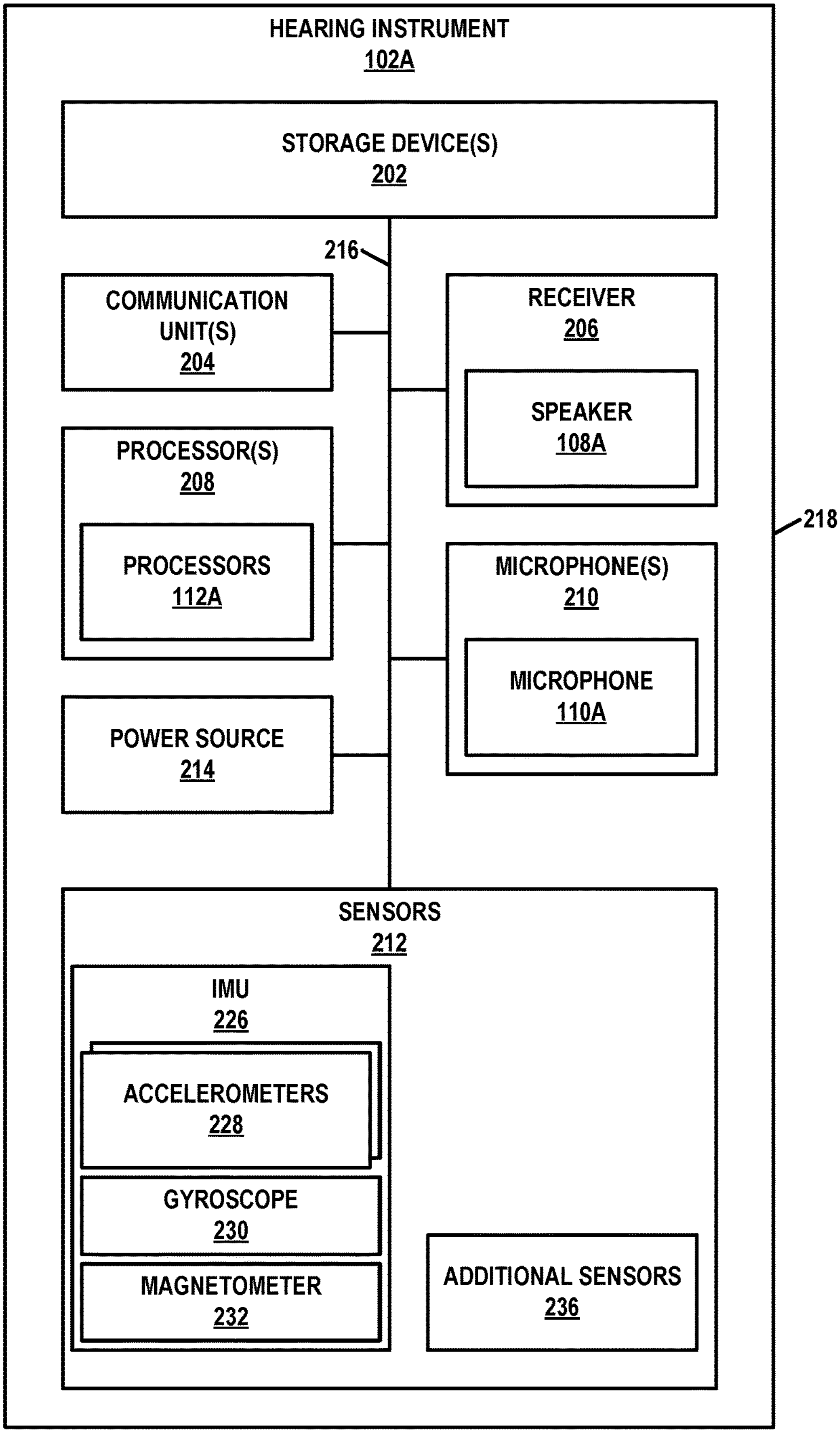
FIG. 2 is a block diagram illustrating example components of a hearing instrument, in accordance with one or more techniques of this disclosure.
Figure 3:
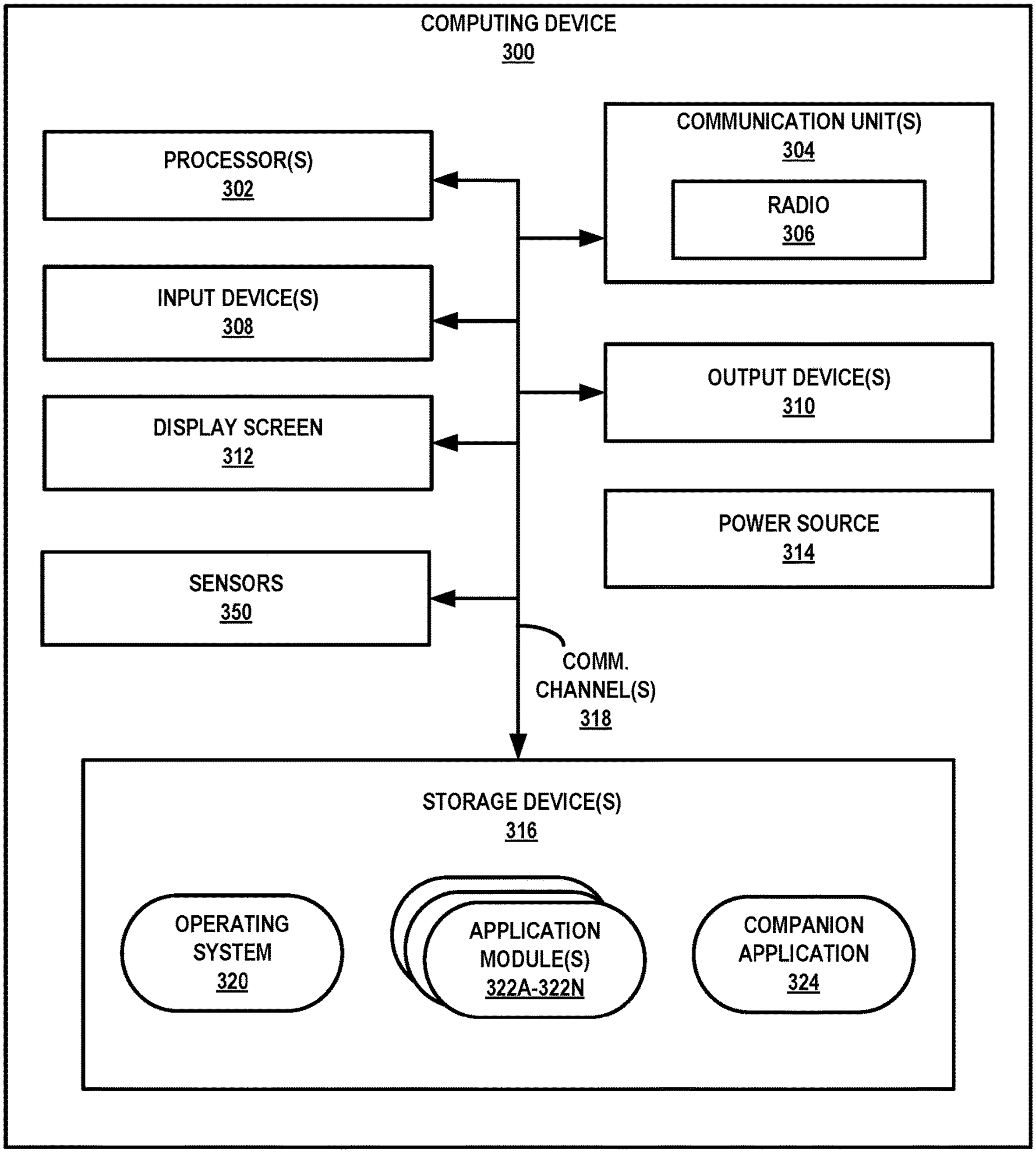
FIG. 3 is a block diagram illustrating example components of a computing device, in accordance with one or more techniques of this disclosure.

In some examples, hearing instruments 102 and computing system 106 may include components in addition to those shown in the example of FIG. 1, e.g., as shown in the examples of FIG. 2 and FIG. 3. For instance, each of hearing instruments 102 may include one or more additional microphones configured to detect sound in an environment of user 104. The additional microphones may include omnidirectional microphones, directional microphones, or other types of microphones.

In some examples, hearing instruments 102 and/or computing system 106 may generate notifications. When hearing instruments 102 and/or computing system 106 generate a notification, hearing instruments 102 and/or computing system 106 may process the notification and output the notification, such as by outputting an audible alert indicative of the notification, outputting haptic feedback indicative of the alert, outputting the notification for display at a display device of computing system 106, and the like.

As used throughout the disclosure, the term notification is used to describe various types of information that may indicate the occurrence of an event. For example, a notification may include, but is not limited to, information specifying an event such as the receipt of a communication message (e.g., an e-mail message, instant message, text message, etc.), a reminder, or any other information that may interest a user. In some examples, the notification may indicate an action to be taken by user 104, such as a notification to adjust one or more settings of hearing instruments 102, a notification that reminds user 104 to clean hearing instruments 102 or a notification that reminds user 104 to hydrate (e.g., drink water), a notification that reminds user 104 to take medication, a notification that reminds user 104 to meditate, a notification that reminds user 104 to perform deep breathing, or a notification that reminds user 104 to walk the dog, etc.

In some examples, user 104 may adjust one or more settings of hearing instruments 102A and/or 102B based on a particular auditory context of user 104. For example, user 104 may visit a café to read a book. In this auditory context, user 104 may typically adjust one or more settings of hearing instruments 102A and/or 102B, such as setting hearing instruments 102 to mute or a lower volume, suppressing certain notifications, or the like, to enable user 104 to concentrate on reading. User 104 may adjust the settings of hearing instruments 102 by pushing physical buttons on hearing instruments 102, adjusting physical sliders on hearing instruments 102, performing tapping gestures on hearing instruments 102, issuing voice commands to hearing instruments 102, using an application (e.g., a smartphone app) to issue commands to hearing instruments 102, or performing other physical actions. In another example, user 104 may visit a café to visit with another person. In this auditory context, user 104 may typically adjust one or more settings of hearing instruments 102A and/or 102B, such as increasing the volume setting on hearing instruments 102A and/or 102B and/or other settings of hearing instruments 102 to enable user 104 to intelligibly listen to the conversation with the other person. In these and other examples, user 104 may typically adjust one or more settings of hearing instruments 102A and/or 102B each time user 104 is in a given auditory context.

Manually adjusting the settings of hearing instruments 102 may be inconvenient or embarrassing to users. For instance, performing visible hand or voice gestures to adjust the settings of hearing instruments 102 may make user 104 feel self-conscious of their hearing impairment. In some examples, user 104 may be unable to physically adjust the settings for a given auditory context. Moreover, manually adjusting the settings of hearing instruments 102 may take time or may simply be irritating to user 104. In some examples, user 104 may be unaware of the settings of hearing instruments 102 to set the hearing instruments to a configuration corresponding to the auditory intent, and may manually set hearing instruments 102 to a less optimal configuration. In accordance with the techniques described in this disclosure, processing system 116 (which may include one or more processors of one or more of hearing instruments 102 and/or computing device 106) may determine an auditory intent of user 104 for a given auditory context. Processing system 116 may associate the auditory intent with one or more actions. In response to determining that user 104 has a particular auditory intent, processing system 116 may dynamically invoke the one or more actions associated with the particular auditory intent, e.g., to update the settings of one or more of hearing instruments 102 to a configuration corresponding to the auditory intent.

Processing system 116 may obtain context information associated with user 104. The context information associated with user 104 may include or may be based on sensor data produced by sensors 114 of hearing instruments 102 and/or computing system 106 that indicate various information associated with user 104. For instance, the context information associated with user 104 may include values of context parameters. Each context parameter may have a value that provides information about the context of user 104. For example, the context information associated with user 104 may include a context parameter indicating an acoustic environment that user 104 is in, a context parameter indicating an activity state of user 104, a context parameter indicating a time and location of user 104, a context parameter indicating a physiological status of user 104, etc. In some examples, the context information associated with user 104 may include or may be based on application data produced by one or more application modules of a computing device, such as data produced by a calendar application that indicates a time and location of user 104 (e.g., via a scheduled event on the calendar), a scheduled call (e.g., video conference call meeting on the calendar), and the like.

As further described below, processing system 116 may apply a machine learning model to determine an auditory intent of user 104 based on at least a portion of the context information. Processing system 116 may obtain the context information of user 104 on a continuous basis, periodic basis, event-driven basis, or other type of basis.

Continuing the example above in which user 104 is at a café to visit with another person, processing system 116 may obtain context information that includes location data indicating that user 104 is located at a café from the location data (where the location data may include or may be based on GPS data, data produced by a location sensor, data produced by a calendar application that indicates user 104 is scheduled to go to a café, time data produced by a clock of computing system 106 that may indicate a time user 104 is scheduled to be located at the café and/or other data sources). The context information may also include data indicating an acoustic environment of user 104 (e.g., noisy environment, detection of own voice and voice of the other person) from audio data produced by microphones 110, an activity state of user 104 (e.g., seated) and/or position of user 104 (e.g., head facing forward) from the activity data produced by motion sensors, vitality information of user 104 (e.g., heart rate is slightly increased from a resting heart rate) from physiological data produced by PPG sensors, or other context information associated with user 104 from sensor data produced by sensors 114 and/or application data produced by application modules. In some examples, the context information of user 104 may include data characterizing repeated actions or movements performed by user 104. For example, the context information of user 104 may include data indicating that user 104 has repeatedly turned their head to the left. Repeatedly turning their head to the left may be an indication that the focus of the attention of user 104 is to the left of user 104.

In some examples, the context information of user 104 may include or may be based on historical data. For instance, the context information of user 104 may include data indicating one or more previous contexts of user 104, historical data regarding actions of user 104, repeated events (e.g., regularly scheduled meetings), or the like. In some examples, the context information of user 104 may include preference data of user 104.

Processing system 116 may determine an auditory intent of user 104 based on the context information of user 104. In some examples, processing system 116 may apply a machine learning model to determine the auditory intent of user 104 based on at least a portion of the context information of user 104. For instance, processing system 116 may determine that user 104 has one auditory intent while visiting a friend at a café, another auditory intent while driving, another auditory intent while reading a book, another auditory intent while running outside, and so on.

Processing system 116 may associate different auditory intents with different set of one or more actions. When processing system 116 determines that user 104 has a particular auditory intent, processing system 116 may invoke the one or more actions associated with the particular auditory intent of user 104. For example, when processing system 116 determines that user 104 has a specific auditory intent, processing system 116 may adjust one or more settings of one or more hearing instruments 102 (e.g., action of increasing the volume setting) to a configuration corresponding to the auditory intent of user 104 (or notify user 104 to adjust the one or more settings). Thus, in this example, processing system 116 may invoke actions to increase the volume setting to hearing instruments 102 when user 104 is in the same or similar auditory context for user 104 (e.g., same location and time, acoustic environment, activity state and position, vitality information, etc.).

Processing system 116 may generate a mapping of one or more actions to auditory intents of user 104. In some examples, processing system 116 may generate a user-specific profile with a mapping of an auditory intent of a specific user with one or more actions associated with the auditory intent. In some examples, processing system 116 may generate a group profile for a group of users. The group profile may include a grouping of similar auditory contexts mapped to one or more actions associated with the auditory contexts of the group of users.

FIG. 2 is a block diagram illustrating example components of hearing instrument 102A, in accordance with one or more aspects of this disclosure. Hearing instrument 102B may include the same or similar components of hearing instrument 102A shown in the example of FIG. 2. Thus, the discussion of FIG. 2 may apply with respect to hearing instrument 102B. In the example of FIG. 2, hearing instrument 102A includes one or more storage devices 202, one or more communication units 204, a receiver 206, one or more processors 208, one or more microphones 210, a set of sensors 212, a power source 214, and one or more communication channels 216. Communication channels 216 provide communication between storage device(s) 202, communication unit(s) 204, receiver 206, processor(s) 208, microphone(s) 210, and sensors 212. Components 202, 204, 206, 208, 210, 212, and 216 may draw electrical power from power source 214.

In the example of FIG. 2, each of components 202, 204, 206, 208, 210, 212, 214, and 216 are contained within a single housing 218. For instance, in examples where hearing instrument 102A is a BTE device, each of components 202, 204, 206, 208, 210, 212, 214, and 216 may be contained within a behind-the-ear housing. In examples where hearing instrument 102A is an ITE, ITC, CIC, or IIC device, each of components 202, 204, 206, 208, 210, 212, 214, and 216 may be contained within an in-ear housing. However, in other examples of this disclosure, components 202, 204, 206, 208, 210, 212, 214, and 216 are distributed among two or more housings. For instance, in an example where hearing instrument 102A is a RIC device, receiver 206, one or more of microphones 210, and one or more of sensors 212 may be included in an in-ear housing separate from a behind-the-ear housing that contains the remaining components of hearing instrument 102A. In such examples, a RIC cable may connect the two housings. In some examples, sensors 212 are examples of one or more of sensors 114A and 114B of FIG. 1.

Furthermore, in the example of FIG. 2, sensors 212 include an inertial measurement unit (IMU) 226 that is configured to generate data regarding the motion of hearing instrument 102A. IMU 226 may include a set of sensors. For instance, in the example of FIG. 2, IMU 226 includes one or more accelerometers 228, a gyroscope 230, a magnetometer 232, combinations thereof, and/or other sensors for determining the motion of hearing instrument 102A. Furthermore, in the example of FIG. 2, hearing instrument 102A may include one or more additional sensors 236. Additional sensors 236 may include a photoplethysmography (PPG) sensor, blood oximetry sensors, blood pressure sensors, electrocardiograph (EKG) sensors, body temperature sensors, electroencephalography (EEG) sensors, heart rate sensors, environmental temperature sensors, environmental pressure sensors, environmental humidity sensors, skin galvanic response sensors, and/or other types of sensors. In other examples, hearing instrument 102A and sensors 212 may include more, fewer, or different components.

Storage device(s) 202 may store data. In some examples, storage device(s) 202 are examples of one or more of storage devices 118A and 118B of FIG. 1. Storage device(s) 202 may include volatile memory and may therefore not retain stored contents if powered off. Examples of volatile memories may include random access memories (RAM), dynamic random access memories (DRAM), static random access memories (SRAM), and other forms of volatile memories known in the art. Storage device(s) 202 may include non-volatile memory for long-term storage of information and may retain information after power on/off cycles. Examples of non-volatile memory may include flash memories or forms of electrically programmable memories (EPROM) or electrically erasable and programmable (EEPROM) memories.

Communication unit(s) 204 may enable hearing instrument 102A to send data to and receive data from one or more other devices, such as a device of computing system 106 (FIG. 1), another hearing instrument (e.g., hearing instrument 102B), an accessory device, a mobile device, or other types of devices. Communication unit(s) 204 may enable hearing instrument 102A to use wireless or non-wireless communication technologies. For instance, communication unit(s) 204 enable hearing instrument 102A to communicate using one or more of various types of wireless technology, such as a BLUETOOTH™ technology, 3G, 4G, 4G LTE, 5G, ZigBee, WI-FI™, Near-Field Magnetic Induction (NFMI), ultrasonic communication, infrared (IR) communication, or another wireless communication technology. In some examples, communication unit(s) 204 may enable hearing instrument 102A to communicate using a cable-based technology, such as a Universal Serial Bus (USB) technology.

Receiver 206 includes one or more speakers for generating audible sound. In the example of FIG. 2, receiver 206 includes speaker 108A (FIG. 1). The speakers of receiver 206 may generate sounds that include a range of frequencies. In some examples, the speakers of receiver 206 includes "woofers" and/or "tweeters" that provide additional frequency range.

Processor(s) 208 include processing circuits configured to perform various processing activities. Processor(s) 208 may process signals generated by microphone(s) 210 to enhance, amplify, or cancel-out particular channels within the incoming sound. Processor(s) 208 may then cause receiver 206 to generate sound based on the processed signals. In some examples, processor(s) 208 include one or more digital signal processors (DSPs). In some examples, processor(s) 208 may cause communication unit(s) 204 to transmit one or more of various types of data. For example, processor(s) 208 may cause communication unit(s) 204 to transmit data such as sensor data produced by one or more of sensors 212, audio data such as audio signals generated by microphone(s) 210 and processed by processor(s) 208, and the like to computing system 106. Furthermore, communication unit(s) 204 may receive audio data from computing system 106 and processor(s) 208 may cause receiver 206 to output sound based on the audio data. For example, communication unit(s) 204 may receive audio data produced by one or more applications (e.g., music or video streaming applications) from computing system 106 and processor(s) 208 may cause receiver 206 to output sound based on the audio data produced by the one or more applications. In the example of FIG. 2, processor(s) 208 include processors 112A (FIG. 1).

Microphone(s) 210 detect incoming sound and generate one or more electrical signals (e.g., an analog or digital electrical signal) representing the incoming sound. In the example of FIG. 2, microphones 210 include microphone 110A (FIG. 1). In some examples, microphone(s) 210 include directional and/or omnidirectional microphones.

In some examples, processor(s) 208 may send sensor data produced by sensors 212 and/or audio data captured by microphones 210 via communication unit(s) 204 to a computing device, such as user 104's smart phone that is communicably coupled to hearing instrument 102A. For example, processor(s) 208 may continuously stream sensor data, such as sensor data as it is produced by sensors 212 and/or audio data as it is captured by microphone(s) 210 to the computing device. In some examples, processor(s) 208 may periodically send the sensor data to the computing device in batches.

In some examples, processor(s) 208 may receive, via communication unit(s) 204, indications of notifications from a computing device, such as a smartphone of user 104. Processor(s) 208 may, in response to receiving a notification, output the notification, such as by outputting an audio indication of the notification at speaker 108A.

In some examples, processor(s) 208 may be configured to perform one or more aspects of the context-based situational awareness system, in accordance with the techniques described in this disclosure. For example, processor(s) 208 may receive sensor data produced by sensors 212 and/or a computing device of computing system 106 (FIG. 1) that indicates various information associated with user 104, and determine, for example, the acoustic environment that user 104 is in, the activity state of user 104, time and location of user 104, the physiological status of user 104, and the like. In some examples, processor(s) 208 may additionally, or alternatively, receive application data produced by one or more applications of a computing device of computing system 106 (FIG. 1), and determine, for example, the time and location of user 104 to predict the acoustic environment that user 104 may be in. Processor(s) 208 may apply a machine learning model to determine the auditory intent of user 104 based on at least a portion of the context information (which may in turn be based on or include sensor data and/or application data).

In some examples, processor(s) 208 may be configured to invoke one or more actions to adjust one or more settings of hearing instrument 102A to set hearing instrument 102A to a configuration corresponding to the auditory intent. For example, hearing instrument 102A may receive, via communication unit(s) 204, instructions to adjust one or more settings for hearing instrument 102A from a computing device of computing system 106. In response, processor(s) 208 may invoke the instructions to adjust one or more settings for hearing instrument 102A. In another example, hearing instrument 102A may receive, via communication unit(s) 204 and from a computing device of computing system 106, an indication of a notification to perform one or more actions to adjust one or more settings of hearing instruments 102A. In response to receiving the notification, processor(s) 208 may cause receiver 206 to output the notification. In some examples, the notification may prompt user 104 to adjust one or more settings of hearing instruments 102A to set the hearing instruments to a configuration corresponding to the auditory intent. In some examples, the notification may provide a reminder to user 104 or provide important information to user 104.

In some examples, processor(s) 208 may, in response receiving subsequent sensor data having the same or similar sensor data and/or application data indicative of the auditory intent, proactively invoke one or more actions, such as actions to adjust one or more settings of hearing instrument 102A to set hearing instrument 102A to a configuration corresponding to the auditory intent.

FIG. 3 is a block diagram illustrating example components of computing device 300, in accordance with one or more aspects of this disclosure. FIG. 3 illustrates only one particular example of computing device 300, and many other example configurations of computing device 300 exist. Computing device 300 may be a computing device in computing system 106 (FIG. 1). For example, computing device 300 may be an example of a smart phone, tablet, wearable (e.g., smart watch), or Internet of Things (IoT) device that communicates with hearing instruments 102 of FIG. 1.

As shown in the example of FIG. 3, computing device 300 includes one or more processors 302, one or more communication units 304, one or more input devices 308, one or more output device(s) 310, a display screen 312, a power source 314, one or more storage device(s) 316, one or more communication channels 318, and sensors 350. Computing device 300 may include other components. For example, computing device 300 may include physical buttons, microphones, speakers, communication ports, and so on. Communication channel(s) 318 may interconnect each of components 302, 304, 308, 310, 312, 316, and 350 for inter-component communications (physically, communicatively, and/or operatively). In some examples, communication channel(s) 318 may include a system bus, a network connection, an inter-process communication data structure, or any other method for communicating data. Power source 314 may provide electrical energy to components 302, 304, 308, 310, 312, 316 and 350.

Storage device(s) 316 may store information required for use during operation of computing device 300. In some examples, storage device(s) 316 have the primary purpose of being a short-term and not a long-term computer-readable storage medium. Storage device(s) 316 may include volatile memory and may therefore not retain stored contents if powered off. In some examples, storage device(s) 316 includes non-volatile memory that is configured for long-term storage of information and for retaining information after power on/off cycles. In some examples, processor(s) 302 of computing device 300 may read and execute instructions stored by storage device(s) 316.

Computing device 300 may include one or more input devices 308 that computing device 300 uses to receive user input. Examples of user input include tactile, audio, and video user input. Input device(s) 308 may include presence-sensitive screens, touch-sensitive screens, mice, keyboards, voice responsive systems, microphones, motion sensors capable of detecting gestures, or other types of devices for detecting input from a human or machine.

Communication unit(s) 304 may enable computing device 300 to send data to and receive data from one or more other computing devices (e.g., via a communication network, such as a local area network or the Internet). For instance, communication unit(s) 304 may be configured to receive data sent by hearing instruments 102, receive data generated by user 104 of hearing instruments 102, send data to hearing instruments 102, and more generally to receive and send data, receive and send messages, and so on. In some examples, communication unit(s) 304 may include wireless transmitters and receivers that enable computing device 300 to communicate wirelessly with the other computing devices. For instance, in the example of FIG. 3, communication unit(s) 304 include a radio 306 that enables computing device 300 to communicate wirelessly with other computing devices, such as hearing instruments 102 (FIG. 1). Examples of communication unit(s) 304 may include network interface cards, Ethernet cards, optical transceivers, radio frequency transceivers, or other types of devices that are able to send and receive information. Other examples of such communication units may include BLUETOOTH™, 3G, 4G, 5G, and WI-FI™ radios, Universal Serial Bus (USB) interfaces, etc. Computing device 300 may use communication unit(s) 304 to communicate with one or more hearing instruments (e.g., hearing instruments 102 (FIG. 1, FIG. 2)). Additionally, computing device 300 may use communication unit(s) 304 to communicate with one or more other devices.

Output device(s) 310 may generate output. Examples of output include tactile, audio, and video output. Output device(s) 310 may include presence-sensitive screens, sound cards, video graphics adapter cards, speakers, liquid crystal displays (LCD), light emitting diode (LED) displays, or other types of devices for generating output. Output device(s) 310 may include display screen 312. In some examples, output device(s) 310 may include virtual reality, augmented reality, or mixed reality display devices.

Sensors 350 may include any input component configured to obtain environmental information about the circumstances surrounding computing device 300, motion information about the activity state of user 104, time and location information of user 104, and/or physiological information that defines the physical well-being of user 104. For instance, sensors 350 may include one or more location sensors (e.g., GPS components, Wi-Fi components, cellular components), one or more temperature sensors, one or more motion sensors (e.g., one or more accelerometers, a gyroscope, a magnetometer, combinations thereof, and/or other sensors for determining the motion of computing device

300), one or more pressure sensors (e.g., barometer), one or more ambient light sensors, and/or any other sensors (e.g., infrared proximity sensor, hygrometer, and the like). Other sensors may include a heart rate sensor, a glucose sensor, a hygrometer sensor, an olfactory sensor, a compass sensor, a step counter sensor, to name a few other non-limiting examples.

Processor(s) 302 may read instructions from storage device(s) 316 and may execute instructions stored by storage device(s) 316. Execution of the instructions by processor(s) 302 may configure or cause computing device 300 to provide at least some of the functionality described in this disclosure to computing device 300 or components thereof (e.g., processor(s) 302). As shown in the example of FIG. 3, storage device(s) 316 include computer-readable instructions associated with operating system 320, application modules 322A-322N (collectively, "application modules 322"), and companion application 324.

Execution of instructions associated with operating system 320 may cause computing device 300 to perform various functions to manage hardware resources of computing device 300 and to provide various common services for other computer programs. Execution of instructions associated with application modules 322 may cause computing device 300 to provide one or more of various applications (e.g., "apps," operating system applications, etc.). Application modules 322 may provide applications, such as text messaging (e.g., SMS) applications, instant messaging applications, email applications, multi-media applications, social media applications, web-browsing applications, text composition applications, calendar applications, and so on.

Companion application 324 is an application that may be used to interact with hearing instruments 102, view information about hearing instruments 102, or perform other activities related to hearing instruments 102. Execution of instructions associated with companion application 324 by processor(s) 302 may cause computing device 300 to perform one or more of various functions. For example, execution of instructions associated with companion application 324 may cause computing device 300 to configure communication unit(s) 304 to receive data from hearing instruments 102 and use the received data to present data to a user, such as user 104 or a third-party user. In some examples, execution of instructions associated with companion application 324 may cause computing device 300 to configure communication unit(s) 304 to send data to hearing instruments 102, such as sensor data and/or application data, or instructions (or a notification for a user 104) to adjust one or more settings of hearing instruments 102. In some examples, companion application 324 is an instance of a web application or server application. In some examples, such as examples where computing device 300 is a mobile device or other type of computing device, companion application 324 may be a native application.

Figure 4:
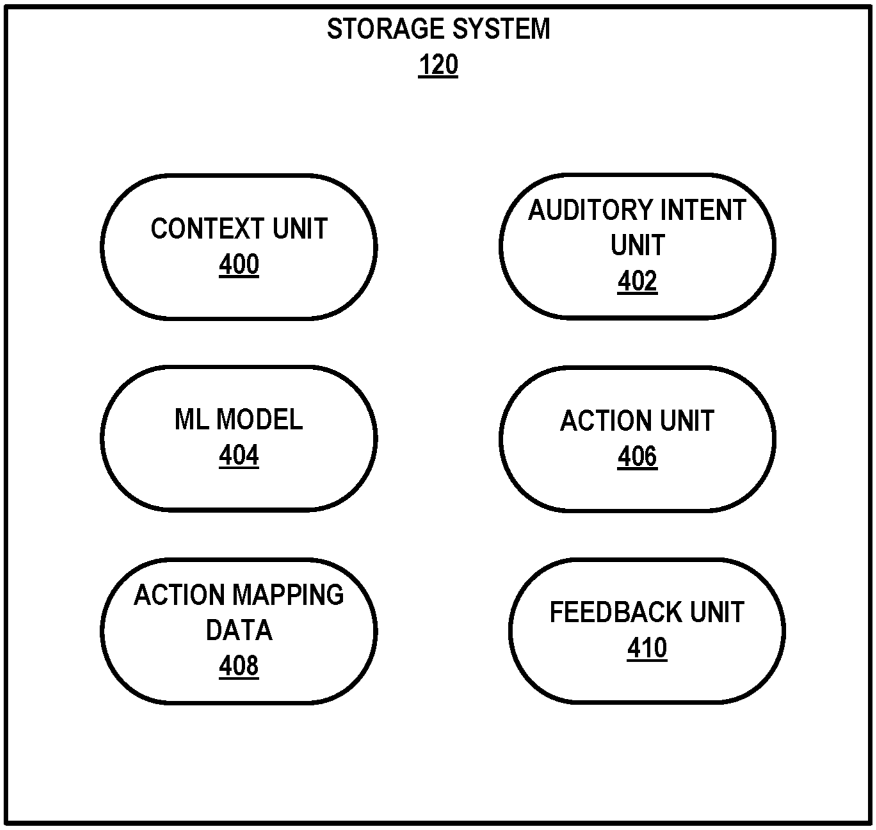
FIG. 4 is a block diagram illustrating an example content of a storage system, in accordance with one or more techniques of this disclosure.

FIG. 4 is a block diagram illustrating an example content of storage system 120, in accordance with one or more techniques of this disclosure. In the example of FIG. 4, storage system 120 includes a context unit 400, an auditory intent unit 402, a machine learning (ML) model 404, an action unit 406, action mapping data 408, and a feedback unit 410. Processors of processing system 116 may execute instructions of context unit 400, auditory intent unit 402, action unit 406, and feedback unit 410. In some examples, context unit 400, auditory intent unit 402, action unit 406, and feedback unit 410 may be wholly or partially implemented in companion application 324 of computing device 300.

Context unit 400 may obtain (e.g., receive or generate) context information associated with user 104. The context information associated with user 104 may include values of one or more context parameters. Example context parameters may include an acoustic environment of user 104, an activity of user 104, whether user 104 is speaking, a location of user 104, and so on. Context unit 400 may determine the values of the context parameters based on sensor data produced by sensors 350 of computing device 300, sensor data produced by sensors 212 of hearing instruments 102, and/or other data sources. In some examples, context unit 400 may process sensor data to obtain the values of the context parameters. Sensors 350 of computing device 300 and/or sensors 212 of hearing instruments 102 may continuously (or periodically) perform sensing functionalities to produce real-time (or near real-time) sensor data and may continuously (or periodically) stream such sets of sensor data to context unit 400.

In some examples, the context information includes values of the activity state of user 104. Context unit 400 may determine the activity state of user 104 based on motion data produced by sensors that obtain physical position and/or movement information of hearing instruments 102 and/or computing device 300 such as in the form of multi-axial accelerometer data, multi-axial rotation rate data, gravity forces data, step counter data, and the like. For example, context unit 400 may determine, based on the motion data included in the sensor data, a physical activity in which user 104 is taking part, such as whether user 104 is running or walking, whether user 104 is still or moving, whether user 104 is sitting down or standing up, a direction a user 104 is facing, the physical exertion level of user 104, and the like. In some examples, context unit 400 may determine, based on the activity data processed from the motion data, other physical activity and/or motion of user 104 such as whether user 104 is falling (fall detection), posture of user 104, body/head gestures of user 104, gait of user 104, etc.

In some examples, the context information includes values of the physical environment of user 104. Context unit 400 may determine the physical environment of user 104 based on environmental data, such as ambient temperature data, ambient light data, ambient air pressure data, ambient relative humidity data, and the like.

In some examples, contextual information includes values of the physiological state of user 104. Context unit 400 may determine a physiological state of user 104 based on physiological data produced by physiological sensors that obtain physiological information of user 104, such as heart rate data, EKG data, EEG data, blood oxygen saturation data, user temperature data, and the like. The sensor data may also include audio data produced by sensors that obtain audio and/or acoustical information, such as from audio signals captured by microphones of input device(s) 308 and/or microphone(s) 210 of hearing instruments 102. For example, context unit 400 may determine, based on the physiological data included in the sensor data and/or health information processed from the physiological data, the physiological state of user 104, such as the heart rate of user 104, whether the heart rate is high or low for user 104, whether user 104 has an irregular heartbeat, blood oxygen saturation level of user 104, the brain activity of user 104, the internal temperature of user 104, and the like. In some examples, health information processed from the physiological data may include depressive behavior of user 104, social activity of user 104, stress levels, etc.

In some examples, the context information includes values of the geographical location of user 104. Context unit 400 may determine the geographical location of user 104 based on location data produced by one or more location sensors (e.g., GPS sensors). In some examples, context unit 400 may determine the location of user 104 based on connection data of hearing instruments 102 and/or computing device 300 (e.g., BLE connection to car's audio to indicate user 104 is in a car, WI-FI connection to home network to indicate user 104 is at home, etc.).

In some examples, the context information includes values of an acoustic environment of user 104. For example, context unit 400 may perform acoustic sound classification of audio data included in the sensor data to classify one or more sounds in the audio data in the environment of user 104. For example, context unit 400 may classify the one or more sounds in the audio data as specific sounds or ambient noises. Specific sounds may include, for example, human voices, such as vocal speech or utterances from user 104 (otherwise referred to as "own voice") or vocal speech or utterances from a third party, noise produced by user 104 interacting with objects, audio produced by hearing instruments 102 and/or computing device 300, and the like. In some examples, context unit 400 may identify the tone of user 104, tempo of speech by user 104, verbal cues from user 104. Ambient noises, such as ambient background noises, may include noise from vehicular traffic, noise from riding in a car, noise from riding in a train, music, background conversations, noise from a nearby television, and the like.

In some examples, context unit 400 may determine, based on one or more acoustic settings of hearing instruments 102, the acoustic environment surrounding user 104 (e.g., quiet, noisy, etc.). For example, context unit 400 may determine, based on acoustic echo cancelation (AEC) and/or active noise cancelation (ANC) data produced by one or more digital signal processors included in processor(s) 208, signal-to-noise ratio, the audio environment surrounding user 104. In some examples, context unit 400 may determine, based on sound pressure level (SPL) data produced by microphone(s) 210 of hearing instruments 102, the audio environment surrounding user 104 (e.g., pressure level of sound, measured in decibels (dB)).

In some examples, context unit 400 may determine, based at least in part on application data produced by one or more application modules 322 of computing device 300 that is operating in combination with hearing instruments 102 (e.g., via inter-component communications), the type of audio activity of user 104 for a given auditory context. For example, context unit 400 may determine whether user 104 is streaming sounds produced by a music or video application executed on computing device 300, streaming audio produced by a phone or video call application executed on computing device 300, or the like.

In some examples, context unit 400 may determine values of one or more context parameters based on application data produced by one or more application modules 322 executed on computing device 300. For example, application module 322A may include a calendar application that may include one or more entries specifying an event or activity user 104 is scheduled to attend. For instance, the calendar application may include a calendar entry to meet with a friend at a particular location at a particular date and time, or a calendar entry to attend a video conferencing call at a particular date and time. As another example, application module 322B may include a text messaging app that may include one or more messages specifying to meet with a friend at a particular location at a particular date and time.

In some examples, context unit 400 may apply an ML model to determine context information based on user actions or patterns of behavior. For example, context unit 400 may determine, based on motion information from IMU 226, context information indicating that user 104 is repeatedly turning their head in a particular direction (e.g., left or right). This behavior may contribute to a determination that user 104 is attempting to listen to a person located in the particular direction.

In some examples, the context information obtained by context unit 400 may include or may be based on data indicating one or more actions of user 104 to adjust one or more settings of hearing instruments 102. For example, context unit 400 may obtain from hearing instruments 102 one or more settings data of hearing instruments 102 via communication unit(s) 304. The settings data may include data specifying an adjustment of volume controls of hearing instruments 102 (e.g., via volume controls on hearing instruments 102 or via companion application 324), an activation or deactivation of an on-demand active tuning (ODAT) setting, an activation or deactivation of an active noise canceling setting, or the like.

In some examples, the context information obtained by context unit 400 may include information from a user profile of user 104. The profile of user 104 may include information about one or more of hearing loss of user 104, lifestyle of user 104, health conditions of user 104, preferences of user 104, and so on. Furthermore, in some examples, the context information obtained by context unit 400 may include information from a group profile of user 104. The group profile may include information about a group of users who are similar to user 104 in one or more respects.

The aforementioned types of context information are provided as examples. Context unit 400 may determine or otherwise obtain context information based on sensor data produced by any sensor or application data produced by any application module to determine context information associated with user 104.

In some examples, context unit 400 has a pluggable architecture that allows the addition and removal of plugins that allow context unit 400 to generate values of various context parameters. For example, a first plugin may allow context unit 400 to use electroencephalogram (EEG) information to determine a context parameter indicating a level of user engagement in a conversation, a second plugin may allow context unit 400 to generate context information indicating one or more aspects of a heart rate of user 104.

Auditory intent unit 402 may determine, based at least in part on a portion of the context information (which may be based on sensor data produced by sensors 350 of computing device 300, sensor data produced by sensors 212 of hearing instruments 102, and/or data processed from sensor data), an auditory intent of user 104. In some examples, auditory intent unit 402 may apply ML model 404 to at least a portion of the context information to determine the auditory intent of user 104. In some examples, ML model 404 may be a supervised learning model, an unsupervised learning model, a structured prediction model (e.g., Hidden Markov Model (HMM)), an artificial neural network (e.g., Recurrent Neural Network (RNN) such as Long Short Term Memory (LSTM) model), or another type of machine learning model.

In an example where ML model 404 is an LS™ model, the LS™ model may have 2 layers, with 128 and 256 neurons, respectively. The activation function of the last fully connected layer of the LS™ model may be a Softmax layer that outputs a probability vector. In examples where auditory intent unit 402 is using the LS™ model to predict one intent and not multiple intents at the same time, a loss function used in training the LS™ may be categorical-cross-entropy.

In an example where ML model 404 is an HMM model, auditory intent unit 402 may be trained similarly to a NN in a supervised fashion. For instance, auditory intent unit 402 may train the HMM using a training vector input of data with appropriate annotation. Annotation is specific decisions expected to be made and expected conditions represented by sensor data. Auditory intent unit 402 may review results by comparing each model and each model hyperparameter set to select a best performance model based on classification performance (e.g., F1, specificity (true negative rate), sensitivity (true positive rate), etc.). Multiple HMMs may be used with a selection of N states defined in the model. The value for N states is optimized to produce the desired decision rate performance (e.g., false negative, false positive, etc. or F1 score or similar metric). The number of models used correlates to the number of assumed hidden context processes that are potentially modeled by discrete context states (e.g., at home in quiet, watching TV, in car, outside, in restaurant). Post-analysis of a trained model may confirm correlation with the assumed processes.

In some examples, auditory intent unit 402 may associate different labels with different auditory intents. The label associated with an auditory intent may identify the auditory intent. For instance, in the example in which user 104 is at a café to visit with another person, auditory intent unit 402 may apply ML model 404 to determine an auditory intent associated with a label of "speaking-at-a-café." In other examples, the labels may be numbers or strings with or without semantic meaning. In some examples, auditory intent unit 402 may receive indications of user input (e.g., from user 104, a clinician, or another person) to assign a label to an auditory intent. Furthermore, in some such instances, if auditory intent unit 402 determines that user 104 has a specific auditory intent and the specific auditory intent is not associated with a label, auditory intent unit 402 may instruct hearing instruments 102 and/or computing system 106 to prompt user 104 to provide a label to be associated with the specific auditory intent.

Input to ML model 404 may include context information such as values of the geographical location of user 104, acoustic environment of user 104, activity state of user 104, and/or other information such as user preferences of user 104, actions user 104 performed to adjust one or more settings of hearing instruments 102, or the like.

As mentioned above, ML model 404 may be a supervised learning model or an unsupervised learning model. As an example of a supervised learning model, ML model 404 may be implemented as a neural network model. The neural network model may include an input layer having input neurons corresponding to different context parameters and an output layer having output neurons corresponding to different auditory intents. The neural network model may also have one or more hidden layers between the input layer and the output layer. In some examples, the neural network model may include two hidden layers of 128 and 256 neurons, respectively. In some examples, the hidden layers may include fully connected layers. The hidden layers may also include one or more pooling layers. Auditory intent unit 402 may obtain training data that includes input-output pairs. The input of an input-output pair may indicate a combination of values of a set of context parameters. The output of an input-output pair may indicate a label of an auditory intent. Auditory intent unit 402 may use the training data to train the neural network model. For instance, auditory intent unit 402 may perform forward propagation using inputs of one or more input-output pairs. Auditory intent unit 402 may apply an error function the resulting outputs to calculate an error value. Auditory intent unit 402 may use the error value in a backpropagation process that updates weights of inputs to neurons of the hidden layers and output layer. By repeating this process with the input-output pairs of the training data, auditory intent unit 402 may adjust the weights of the inputs to the neurons such that the neural network model correctly indicates a label corresponding to the combination of values of context parameters of the inputs.

Auditory intent unit 402 may obtain the training data in one or more ways. For example, auditory intent unit 402 may determine that user 104 is a member of a group of users. Members of the group of users may be similar in one or more respects. For instance, members of the group may have similar types and degrees of hearing loss, similar lifestyles, engage similar activities, and so on. Computing system 106 may store a group profile for the group of users. The group profile for the group of users may include sets of context information and corresponding action sets. The action set corresponding to a set of context information may be the most performed actions of users in the group of users when the users are in a context defined by the context information. For example, the group profile may include a set of context information indicating a noisy acoustic environment, while the user is speaking, and while omnidirectional microphone pickup is active. In this example, the group profile may indicate that the most performed action of users in the group of users is to activate beamforming and perform other actions to change the settings of their hearing instruments to a configuration consistent with a "speaking-at-a-café" intent. Thus, in this example, the training data may include an input-output pair in which the input of the input-output pair is the context information of a noisy acoustic environment, while the user is speaking, and while omnidirectional microphone pickup is active and the output of the output pair is a label of the "speaking-at-a-café" intent.

As an example of an unsupervised learning model, ML model 404 may be implemented using a k-means clustering model. In this example, context information may include values of in context parameters. Each observed combination of values of the in context parameters may correspond to a different a data point (i.e., an "observed point") in an m-dimensional space. Auditory intent unit 402 may initialize k centroid points. Each of the k centroid points corresponds to a different label. Auditory intent unit 402 may assign each of the observed points to its nearest centroid point, as determined using Euclidean distances between the observed points and the centroid points. Auditory intent unit 402 may then update the centroid points to be central to the observed points assigned to the centroid point. Auditory intent unit 402 may repeat this process of assigning observed points to centroid points and updating the centroid points. Auditory intent unit 402 may determine that the k-means clustering process is complete when auditory intent unit 402 determines that the updating step does not result in any of the observed points changing from being closest to one of the centroid points to being closest to another one of the centroid points. After completing the k-means clustering process, when auditory intent unit 402 obtains context information corresponding to a new observed data point, auditory intent unit 402 may determine that the label for the auditory intent of user 104 is the label corresponding to the centroid point closest to the new observed data point.

Note that there may be a very large number of combinations of values of context parameters. Thus, it may be impractical to establish a direct mapping from each combination of values of the context parameters to a specific auditory intent. Training a machine learning model to determine an auditory intent may allow auditory intent unit 402 to determine auditory intents for combinations of values of context parameters for which auditory intent unit 402 has not received indications of user actions.

Example auditory intents of user 104 for a given auditory context may include comfort, conversational listening (e.g., intelligibility), music listening, etc. An auditory intent of comfort may represent user 104's intent to reduce or eliminate distractions (e.g., silencing some or all notifications), reduce or disable audio on hearing instruments 102 (e.g., lowering volume or setting to mute), or the like. User 104 may have the auditory intent of comfort in one or more auditory contexts, such as being in a noisy acoustic environment and user 104 is not actively engaged in conversation (e.g., reading), etc. An auditory intent of conversational listening may represent an intent of user 104 to intelligibly listen to speech via hearing instruments 102 (e.g., increased volume and/or activated noise canceling). User 104 may desire the auditory intent of conversational listening in one or more auditory contexts, such as actively engaging in a conversation with a third party, engaging in a phone call, listening to a speaker at a seminar, etc.

As another example, auditory intent unit 402 may determine user 104 is repeatedly adjusting one or more settings of hearing instruments 102 (e.g., decreasing volume) when user 104 is in noisy acoustic environment when user 104 is seated and user 104's head is facing downward (e.g., to read a book). In this example, auditory intent unit 402 may determine that the auditory intent for this auditory context is comfort.

Action unit 406 may be configured to invoke one or more actions associated with the auditory intent of user 104. For example, action unit 406 may adjust one or more settings of hearing instruments 102 to set hearing instruments 102 to a configuration corresponding to the auditory intent of user 104. In some examples, action unit 406 may cause hearing instruments 102 or another device (e.g., user's smart phone) to generate a notification associated with the auditory intent of user 104. In this way, auditory intent unit 402 and action unit 406 may proactively adjust one or more settings of hearing instruments 102 for an auditory intent and/or provide a notification associated with the auditory intent of user 104 without user interaction to controls of hearing instruments 102. In some examples, action unit 406 may cause hearing instruments 102 or another device to send a notification to user 104 to instruct user 104 to adjust the one or more settings of hearing instruments 102 for the auditory intent. In some examples, action unit 406 may cause hearing instruments 102 or another device to send a notification to user 104 to approve, deny, or modify the adjusted settings of hearing instruments 102 for the auditory intent.

Action mapping data 408 may include data that maps auditory intents to action sets. In this example, action mapping data 408 may include data that associates an auditory intent with one or more actions. Each action set may include one or more actions. In some examples, there may be auditory intents that are mapped to empty action sets. When auditory intent unit 402 determines that user 104 has a specific auditory intent, action unit 406 may use action mapping data 408 to identify an action set mapped to the specific auditory intent.

In some examples, action unit 406 may generate action mapping data 408 based on actions of user 104. For example, action unit 406 may track actions of user 104 while user 104 is in different contexts. Example actions of user 104 may include user input to controls of hearing instruments 102 or control settings provided by companion application 324 executed on computing device 300, such as adjusting settings of hearing instruments 102, muting notifications of hearing instruments 102 or computing device 300, turning on notifications of hearing instruments 102 or computing device 300, activating or deactivating a remote microphone, and so on. Thus, in one example, if auditory intent unit 402 determines that user 104 has the speaking-at-a-café intent (i.e., the current context of user 104 is speaking at a café) and user 104 turns on a directional processing mode (e.g., a beamforming mode) while user 104 has the speaking-at-a-café intent, action unit 406 may update action mapping data 408 such that the action set mapped to the speaking-at-a-café intent includes activating the directional processing mode. In another example, if hearing instruments 102 receive input from user 104 to increase a volume of hearing instruments 102 while user 104 has a specific auditory intent, action unit 406 may update action mapping data 408 such that the action set mapped to the specific auditory intent includes an action of increasing the volume of hearing instruments 102. In another example, if computing device 300 receives an indication of user input to mute notifications while user 104 has a specific auditory intent (e.g., an auditory intent associated with watching a movie at a theatre), action unit 406 may update action mapping data 408 such that the action set associated with this auditory intent includes an action of muting notifications.

In some examples, the actions associated with a context may include activating/deactivating specific sensors or changing the sampling resolution and/or sampling rate of one or more sensors. The sampling rate of a sensors is how frequently a sensor generates data. The sampling resolution of a sensor is the amount of data (e.g., bits) used to represent each sample collected by the sensor. Selectively activating/deactivating sensors or changing sampling rate of sensors may reduce overall power consumption of the sensors. Reducing overall power consumption of sensors may be advantageous in hearing instruments and mobile computing devices where power from batteries may be limited. As an example of activating/deactivating a sensor or increasing/decreasing the sampling rate of a sensor, consider a scenario in which hearing instruments 102 include a PPG sensor and an IMU. It may be important to activate the PPG sensor and increase the sampling rate to gather frequent heart rate measurements while user 104 is exercising than when user 104 is sleeping. If auditory intent unit 402 determines that the auditory intent of user 104 is sleep (which may be based on IMU data indicating relative lack of motion), the actions associated with the sleep intent may include deactivating the PPG sensor or reducing the sampling rate of the PPG sensor to gather heart rate measurements less frequently. In another example, context unit 404 may use data from EEG sensors to determine whether user 104 is mentally engaged in a conversation. In this example, auditory intent unit 402 determines (e.g., based on context information based on data from microphones indicating that there is no ongoing conversation) that an auditory intent of user 104 does not involve participation in a conversation, the actions associated with this auditory intent may include deactivation of the EEG sensors if the EEG sensors are active. In some examples, changing sampling resolution of sensors may reduce overall power consumption of the sensors. For example, it may be less important to use precise motion data while user 104 is sleeping. In this example, if auditory intent unit 402 determines that the auditory intent of user 104 is sleep, the actions associated with the sleep intent may include reducing the sample resolution for each sample of motion data.

Feedback unit 410 may provide further refinement to the auditory intent and/or one or more actions associated with the auditory intent. For example, feedback unit 410 may receive indications of user input to set which actions are in the action set associated with an auditory intent. In this example, feedback unit 410 may modify the action set in action mapping data 408 accordingly. For instance, an action set associated with an auditory intent of conversational listening may initially include setting the volume of hearing instruments 102 to a maximum setting. In this example, system 100 may receive feedback from user 104 (e.g., via companion application 324) with a user preference to have the volume be a lower setting than the maximum setting. In this example, feedback unit 410 may update action mapping data 408 to include an action to set the volume to the lower setting. In some examples, feedback unit 410 may generate new training data based on the actions of user 104. For example, the actions of user 104 may change the settings of hearing instruments 102 to a configuration consistent with a first auditory intent different from a second auditory intent determined by auditory intent unit 402. Hence, in this example, feedback unit 410 may generate an input-output pair in which the input indicates context information used by auditory intent unit 402 to determine the second auditory intent, but the output indicates the first auditory intent.

In some examples, while user 104 is in a given context, feedback unit 410 may receive indications of user input to change the settings of hearing instruments to a configuration not consistent with any of the auditory intents. In this example, feedback unit 410 may establish a new auditory intent. Feedback unit 410 may associate the new auditory intent with actions to change the settings of hearing instruments 102 in accordance with the user's actions. Additionally, feedback unit 410 may generate training data in which context information of the given context is the input data of an input-output pair and the output data of the input-output pair is data indicating the new auditory intent. In examples where ML model 404 is a neural network model, the output layer may include initially extra output neurons so that new auditory intents may be generated.

In some examples, feedback unit 410 may determine that hearing instruments 102 or computing system 106 has received different or contradictory user inputs while in the same context. For example, auditory intent unit 402 may determine that user 104 has a first auditory intent. In this example, hearing instruments 102 or computing system 106 may receive, at one time while user 104 is determined to have the first auditory intent, user input to increase the volume of hearing instruments 102. At another time while user 104 is determined to have the first auditory intent, hearing instruments 102 or computing system 106 may receive user input to decrease the volume of hearing instruments 102. In this example, auditory intent unit 402 may determine that user 104 has the same auditory intent despite the context information including different values of context parameters (e.g., different user input to change volume settings). However, the different values of the context parameters may in fact correspond to different auditory intents instead of the same auditory intent. Feedback unit 410 may determine whether user 104 exhibits a pattern of providing different user inputs while user 104 is determined to have the first auditory intent, and based on that determination, may determine that user 104 has a second auditory intent instead of the first auditory intent. Auditory intent unit 402 may retrain ML model 404 to recognize the second auditory intent. For instance, in an example where ML model 404 is implemented as a k-means clustering model that includes k centroid points, auditory intent unit 402 may generate a new centroid point such that the k-means clustering model includes k+1 points. Auditory intent unit 402 may position the new centroid point at coordinates corresponding to the values of the context parameters present when system 100 (e.g., hearing instruments 102 or computing system 106) received inputs indicating contrary actions.

In some examples, auditory intent unit 402 may generate a user-specific profile associating an auditory intent of a specific user (e.g., user 104) with one or more actions associated with the auditory intent. In some examples, computing system 106 may present the user-specific profile to a clinician to help the clinician understand the lifestyle of user 104 and patterns of use of hearing instruments 102 by user 104. Being able to review the user-specific profile may help the clinician during a patient consultation process to effectively address concerns and questions of user 104.

In some examples, computing system 106 may analyze and present longitudinal data from multiple sensors and inputs of user 104 to a clinician for monitoring benefits and satisfaction of user 104 with hearing instruments 102. The longitudinal data from the sensors and inputs may include data generated over the course of a time interval. For the same or similar situation or scenario, if the longitudinal data show that user 104 did not need to adjust hearing instruments 102 and still maintained the same number of visits in this situation/scenario, user 104 is likely satisfied with the performance of hearing instruments 102. A summary of the longitudinal data may include warnings regarding the situations or scenarios with which user 104 is still having problems. User 104 may not remember some of these problems when contacting a clinician, especially for older patients with compromised cognitive abilities.

A group profile may include data indicating auditory contexts experienced by a group of users and one or more actions associated with the auditory contexts performed by the group of users, such as actions to adjust settings of hearing instruments. A clinician may use the user-specific profile and/or group profile to analyze the context information of user 104 to determine the user's lifestyle and use patterns of hearing instruments 102. For example, user 104 may not remember the auditory context in which user 104 is experiencing problems in adjusting one or more settings of hearing instruments 102 to the user's satisfaction. In this example, the clinician may use the user-specific profile and/or group profile to learn of the user's auditory context and may provide adjustment of one or more settings of hearing instruments 102 for the auditory context. In some examples, a new audiologist may use the group profile to provide initial configuration of hearing instruments of other users.

Figure 5:
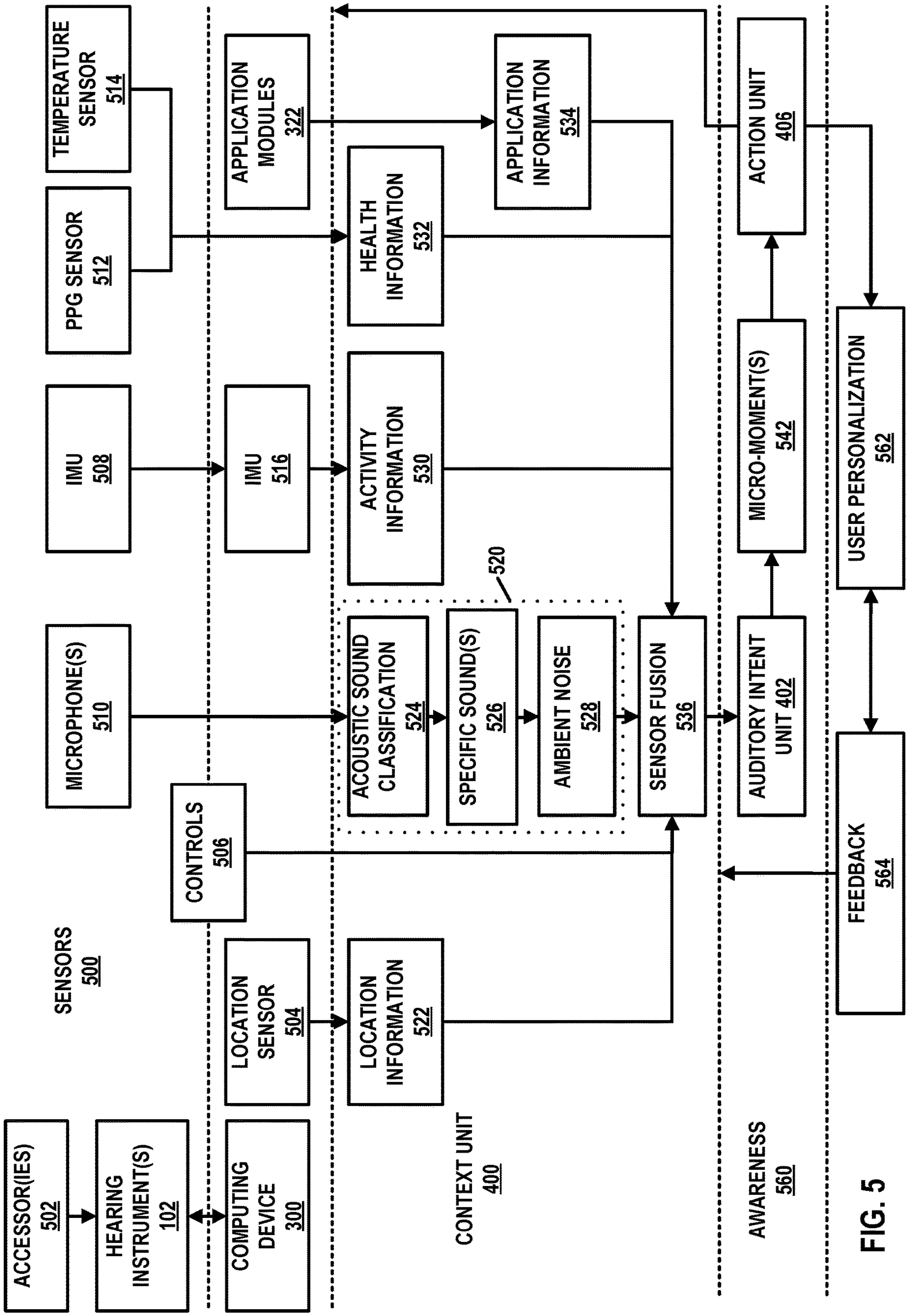
FIG. 5 is a block diagram illustrating an example operation of a system to perform the techniques of this disclosure.

FIG. 5 is a block diagram illustrating an example operation of system 100 to perform the techniques of this disclosure. As shown in FIG. 5, hearing instruments 102 may be communicably coupled to computing device 300 and one or more accessories 502, such as a remote microphone, a table microphone, a television audio streamer and the like. Sensors 500 may include sensors 118A, 118B of hearing instruments 102 and/or one or more accessories 502. For instance, sensors 500 of hearing instruments 102 and accessories 502 may include one or more of microphones 510, IMU 508, PPG sensor 512, body temperature sensor 514, and the like. Sensors 500 may also include sensors of computing device 300, such as location sensor 504, IMU 516, and the like.

Sensors 500 may also include controls 506 of hearing instruments 102 and computing device 300, such as buttons, touchscreens, volume controls, and the like.

In the example of FIG. 5, hearing instruments 102 and accessories 502 may stream (or periodically send) data generated by sensors 500 to computing device 300. Computing device 300 may stream (or periodically send) data generated by sensors of computing device 300 and data generated by sensors 500 of hearing instruments 102 and accessories 502 to a computing device implementing context unit 400. In this way, context unit 400 may obtain data generated by sensors of hearing instruments 102, accessories 502, and computing device 300. For example, one or more of microphones 510 may continuously capture and stream audio and IMUs 508 and 516 may continuously capture and stream motion data of hearing instruments 102 and computing device 300, respectively.

Context unit 400 (which may be implemented completely or in part at one or more of hearing instruments 102, computing device 300, or another device of computing system 106) may perform a data segmentation process on data received from hearing instruments 102, accessories 502, and computing device 300. The data segmentation process may generate context information that auditory intent unit 402 may use to determine an auditory intent of user 104.

In some examples, context unit 400 may generate location information 522 of user 104 based on the sensor data from location sensor 504, generate mobility and/or activity information 530 of user 104 based on the sensor data from IMUs 508 and 516, and generate health information 532 of user 104 based on the sensor data from PPG sensor 512 and body temperature sensor 514. Context unit 400 may also receive sensor data, such as audio data, from one or more microphones 510, and may process such audio data, such as by performing acoustic sound classification 524 to classify the audio data, determine one or more specific sounds 526 from the audio data, and/or determine characteristics of ambient noise 528 from the audio data. The acoustic sound classification 524, specific sounds 526, ambient noise 528, and other processed audio data may collectively be referred to as audio information 520.

In some examples, computing device 300 includes one or more application modules 322 that each generate application information 534. Context unit 400 may receive application information 534 and may process application information 534 to generate, for example, context information associated with user 104. For example, application information 534 may include scheduled events and/or activities user 104 is to attend, such as meeting another person at a cafe.

Context unit 400 may, as part of performing data segmentation, obtain data from a plurality of data sources, such as controls 506, audio information 520, location information 522, activity information 530, health information 532, and/or application information 534 and generate context information (illustrated as sensor fusion processes 536) for use by auditory intent unit 402.

Auditory intent unit 402 may, as part of a context-based situational awareness phase 560, determine an auditory intent of user 104 based on at least a portion of the context information obtained from context unit 400. For example, auditory intent unit 402 may utilize context information generated from sensor data and/or application data captured by sensors 500 across multiple devices, such as one or more accessories 502, hearing instruments 102, and computing device 300, to determine the auditory intent of user 104. Auditory intent unit 402 may apply ML model 406 (FIG. 4) to determine the auditory intent of user 104 based on the context information. Action unit 406 may invoke the one or more actions associated with the determined auditory intent of user 104. For example, action unit 406 may adjust one or more settings of hearing instruments 102.

In some examples, action unit 406 may receive data indicating the timing for invoking an action (illustrated as "micro-moment(s) 542"). For example, micro-moment(s) 542 may include a time period at which user 104 is available to interact with a notification to perform an action, such as to output a notification at the time period. As one example, auditory intent unit 402 may determine, based on at least a portion of the context information, user 104 is in car and may be distracted from receiving a notification. Auditory intent unit 402 may instruct action unit 406 to invoke the action of sending a notification to user 104 after user 104 is no longer in the car. Additional examples of determining the availability of user 104 to interact with a notification is described in U.S. Provisional Application No. 63/218,735, entitled "CONTEXT-BASED USER AVAILABILITY FOR NOTIFICATIONS," the entire contents of which is incorporated by reference herein.

In some examples, action unit 406 may send a notification for user 104 to take an action. In these examples, user 104 may receive a notification, e.g., through a user interface to control settings of hearing instruments 102 or as an audio notification output by receiver 206 of hearing instruments 102, and in response, user 104 may invoke the action or not invoke the action (illustrated as "user personalization 562"), e.g., by providing input to the user interface to control the settings of hearing instruments 102. In some examples, user 104 may provide feedback 564 to provide further refinement to the auditory intent and/or one or more actions associated with the auditory intent. In some examples, user 104 may provide feedback 564 such as approving, rejecting, and/or modifying the auditory intent or the one or more actions associated with the auditory intent. For example, feedback unit 410 may update action mapping data 408 to adjust or remove an action mapped to an auditory intent. In some examples, feedback unit 410 may generate new training data based on the actions of user 104. For example, the actions of user 104 may change the settings of hearing instruments 102 to a configuration consistent with a first auditory intent different from a second auditory intent determined by auditory intent unit 402. Hence, in this example, feedback unit 410 may generate an input-output pair in which the input indicates context information used by auditory intent unit 402 to determine the second auditory intent, but the output indicates the first auditory intent.

Figure 6:
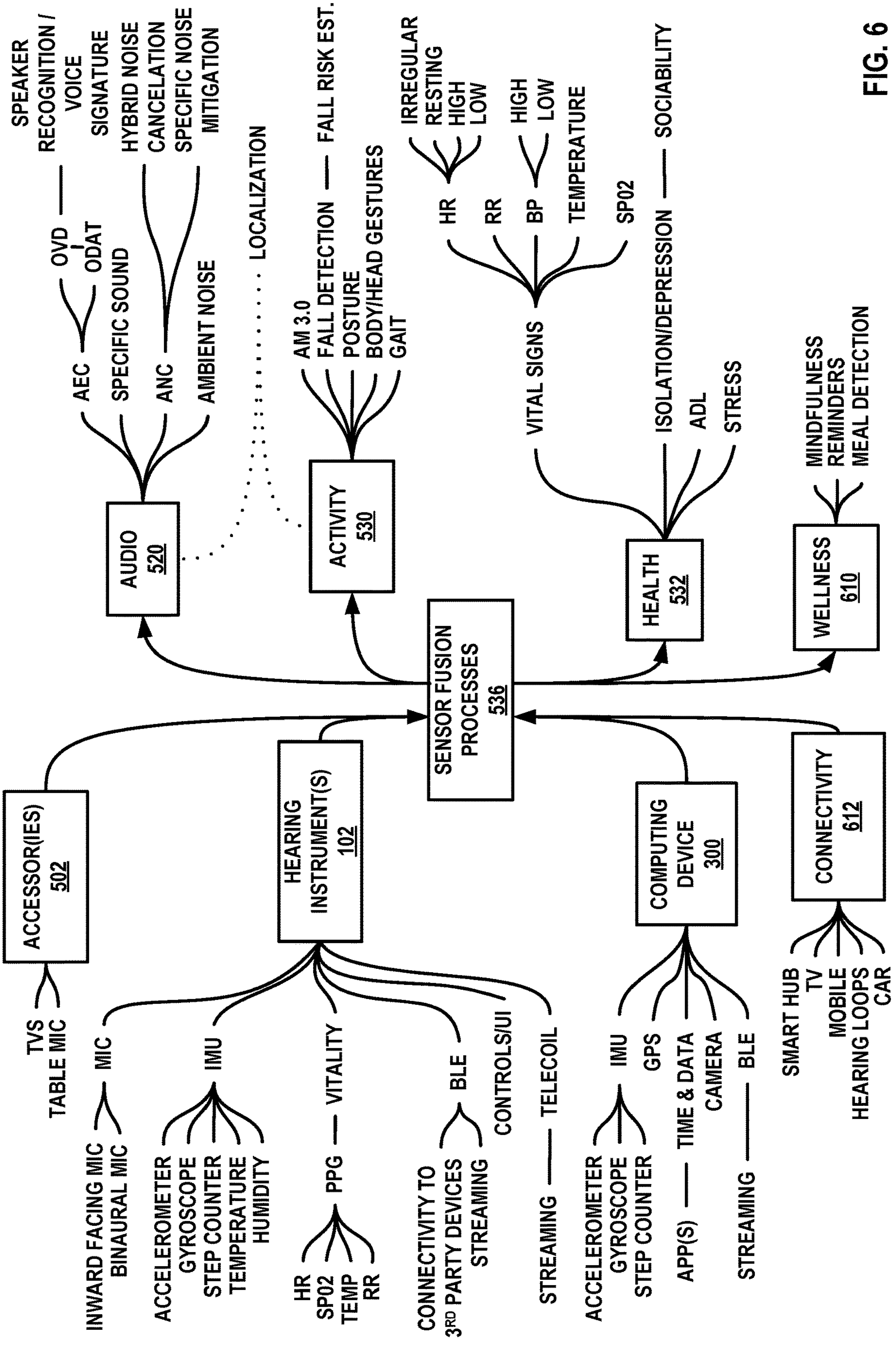
FIG. 6 is a block diagram illustrating an example of obtaining context information and system response history, in accordance with the techniques of this disclosure.

FIG. 6 is a block diagram illustrating an example of obtaining context information, in accordance with the techniques of this disclosure. For ease of illustration, FIG. 6 is described with respect to FIGS. 1-5. In the example of FIG. 6, context unit 400 may obtain a stream of data associated with user 104 (illustrated as sensor fusion processes 536) and use at least a portion of the data to determine the auditory intent of user 104. For example, context unit 400 may receive sensor data generated by one or more sensors of one or more hearing instruments 102, computing device 300, and/or one or more accessories 502. Context unit 400 may additionally, or alternatively, receive information determined from the sensor data, such as audio information 520, activity information 530, health information 532, wellness information 610, and/or connectivity information 612.

As one example, the context information that context unit 400 generates by applying sensor fusion processes 536 may include audio-related data 520 determined from audio data generated by microphone (e.g., "Table Mic" of accessories 502, "inward facing mic" or "binaural mic" of hearing instruments 102 in FIG. 6). For example, context unit 400 may receive audio data generated by microphone(s) 510 and process such audio data, such as by performing acoustic sound classification 524 to classify the audio data, determine one or more specific sounds 526 from the audio data, and/or determine characteristics of ambient noise 528 from the audio data, represented by audio 520. Audio information 520 may include acoustic echo cancelation data (e.g., data from own voice detection (OVD) that provides speaker recognition or voice signature, on-demand active tuning (ODAT)), active noise cancelation (ANC) data (e.g., hybrid noise cancelation or specific noise mitigation), or the like.

Furthermore, in the example of FIG. 6, the context information that context unit 400 generates by applying sensor fusion processes 536 may include activity information 530. Activity information 530 may include mobility or activity state information determined from motion data produced by IMU 508 of one or more hearing instruments 102 and/or IMU 516 of computing device 300. The data produced by IMU sensors may include motion data (e.g., generated by one or more accelerometers, a gyroscope, a step counter), temperature data, and/or humidity data. Context unit 400 may receive the motion data and process the motion data to determine activity information 530, which may include activity monitoring data AM 3.0, fall detection data (e.g., fall risk estimation), posture data, body or head gesture data, and/or gait data of user 104. The activity monitoring data include step information (e.g., user steps per minute, user step counts, etc.) and activity information (e.g., running, sitting, biking, weightlifting, rowing, etc.). In some examples, context unit 400 may use audio information 520 and activity information 530 to determine data indicating localization of audio data. For example, context unit 400 may receive activity information 530 indicating a head gesture of user 104 is facing left and audio information 520 indicating whether user 104's own voice is detected, and determine from the combination of audio information 520 and activity information 530 that user 104 may be having a conversation with a person to the left of user 104. In some examples, hearing instruments 102 or computing device 300 may generate the activity monitoring data based on raw motion information from one or more of IMUs 508, 516, gyroscopes, integration of acceleration (net speed), a Fast Fourier Transform (FFT) of motion signals (e.g., to capture repetitive motion over time, such as a step rate from head bob), and so on. In some examples, hearing instruments 102 or computing device 300 may generate fall detection data based on IMU data showing motion of user 104 identified as a fall (e.g., detect freefall (downward vector of greater than a threshold value), impact (large energy acceleration in opposite direction in a small unit of time), and afterwards a reduced presence of motion indicating stillness of the body (integration of acceleration signal less than a threshold)).

In the example of FIG. 6, the context information that context unit 400 generates by applying sensor fusion processes 536 may include health information 532. Health information 532 may include physiological data produced by physiological sensors, such as PPG sensor 512 and/or body temperature sensor 514 integrated with PPG sensor 512 of one or more hearing instruments 102. The physiological data produced by PPG sensor 512 and/or body temperature sensor 514 may include heart rate, oxygen levels (e.g., peripheral oxygen saturation ($SpO_2$)), body temperature, and resting heart rate. Context unit 400 may receive the physiological data and determine, based on the physiological data, health information 532 such as whether a heart rate is irregular, resting, high or low, and/or whether blood pressure is high or low, whether user 104 is exhibiting depressive behavior, stress (e.g., from oxygen levels and heart rate), or activities of daily living (ADL). Context unit 400 may obtain health information 532 from the one or more processors of hearing instruments 102 and/or one or more processors of computing device 300.

Furthermore, in the example of FIG. 6, the context information that context unit 400 generates by applying sensor fusion processes 536 may include wellness information 610. Wellness information 610 may include information such as responsiveness to reminders, such as reminders for user 104 to take an action, such as to stand and stretch, to clean one or more hearing instruments 102, hydrate, eat a meal, meditate, or other notifications and/or reminders. Other wellness information 610 may include information indicating whether user 104 is engaging in mindfulness activities, eating meals ("meal detection"), and so on.

Context unit 400 may use connectivity information 612 as basis for generating context information. Connectivity information 612 may include information indicating connectivity of one or more hearing instrument(s) 102 and/or computing device 300. For example, one or more hearing instruments 102 and/or computing device 300 may be communicatively coupled to devices such as a smart hub (e.g., Z-Wave hub), television, mobile device, hearing loops (e.g., via telecoil of hearing instruments 102), car, etc. The one or more processors of hearing instruments 102 and/or one or more processors of computing device 300 may receive connectivity information.

Context unit 400 may receive sensor data generated by one or more sensors of one or more accessories 502. For example, context unit 400 may receive sensor data generated by one or more accessories 502 such as a television streamer (TVS), a table microphone, or other accessory. Furthermore, in the example of FIG. 6, context unit 400 may receive sensor data generated by a plurality of sensors of one or more hearing instruments 102. For instance, context unit 400 may receive motion data generated by IMU sensors 508 (e.g., accelerometer, gyroscope, step counter, ambient temperature, humidity), physiological data produced by PPG sensor 512 (e.g., heart rate, $SpO_2$, body temperature, resting heart rate), connectivity data (e.g., connectivity to third-party devices, connectivity to device streaming audio/video content, connectivity to telecoil), data indicating user interaction to controls or the user interface of hearing instruments 102 (e.g., volume controls).

In some examples, context unit 400 may receive sensor data generated by a plurality of sensors of computing device 300. For instance, context unit 400 may receive motion data generated by IMU sensors 510 (e.g., accelerometer, gyroscope, step counter), location data generated by location sensors (e.g., GPS sensor), image/video data generated by a camera, and connectivity data. In some examples, context unit 400 may receive application data generated by one or more application modules 322, such as a calendar application, a task list application, or the like.

FIG. 7 is an example table 700 containing context information and system response history, in accordance with the techniques of this disclosure. For ease of illustration, FIG. 7 is described with respect to FIGS. 1-6. Table 700 includes columns 702 corresponding to different time intervals. In the example of FIG. 7, the time intervals are each 1 minute in duration and correspond to 8:00 to 8:09. In other examples, time intervals of other durations may be used, and the time intervals may correspond to other times.

Table 700 includes rows 704A-704I (collectively, "rows 704"). Rows 704A-704H correspond to different context parameters. Context unit 400 may determine the values of the context parameters in rows 704A-704H based on sensor data produced by one or more sensors 212 of hearing instruments 102 and/or one or more sensors 350 of computing device 300, and/or application data produced by one or more application modules 322 of computing device 300. In this example, row 704A corresponds to a time interval, row 704B corresponds to an activity, row 704C corresponds to an acoustic environment classification (AEC), row 704D corresponds to whether streaming is active, row 704E corresponds to whether user 104 is engaging in a phone call, row 704F corresponds to own-voice detection (e.g., whether the voice of user 104 and/or an environmental voice is detected), row 704G corresponds to a sound pressure level (SPL), and row 704H corresponds to a heart rate of user 104. The combination of values of the context parameters in rows 704A-704H of a column of table 700 may be referred to as a "context." In other examples, table 700 may include more, fewer, or different rows for different context parameters. Row 704I corresponds user actions performed while during the time interval.

In this example, context unit 400 may obtain time data in row 702A based on a clock of computing device 300 and/or hearing instruments 102; obtain activity information in row 704B (e.g., activity information 530) based on motion data generated by IMU 508 of hearing instruments 102 and/or IMU 516 of computing device 300; obtain AEC information in row 704C based on audio data generated by microphone(s) 410; obtain streaming information in row 704D (which may indicate whether hearing instruments 102 and/or computing device 300 are streaming audio/video content) based on streaming data of third party devices connected to hearing instruments 102; obtain phone call data in row 704E based on data from a smart phone of user 104; obtain OVD data in row 704F based on information from microphones and/or other sensors of hearing instruments 102 or computing device 300; obtain sound pressure level (SPL) in row 704G based on data from microphones; generate heart rate data in row 704H based on data from PPG sensor 512; and obtain user action data in row 704I indicating user 104's interaction to controls 406 of hearing instruments 102 based control inputs and so on.

For instance, in the example of FIG. 7, context unit 400 may obtain context information indicating that, at 8:05, user 104 was sitting, was in an acoustic environment of speech in noise (SPN), was not streaming media, was not engaged in a phone call, was speaking along with environmental voices (OV+EV), there was a SPL of 55, and had a heart rate of 78 beats per minute. Furthermore, controls 506 may record that user increased the volume of hearing instruments 102 (e.g., VC++). Other example actions may include setting the volume controls via a user interface for hearing instruments 102 to a max setting (e.g., UI VC MAX) occurring at 8:06, activating on-demand active tuning (ODAT) occurring at 8:07, activating mobile streaming occurring at 8:09, and so on. In this example, auditory intent unit 402 may determine the auditory intent for user 104 based on values of context parameters in rows 704A-704H. For example, auditory intent unit 402 may determine the auditory intent for user 104 is for conversational listening based on OVD data 704F indicating that the voice of user 104 and/or an environmental voice was detected at 8:04 to 8:07, user action 704I including values indicating user 104 increased the volume settings to hearing instruments 102, and other values of one or more context parameters in table 700.

Although not shown in FIG. 7, context unit 404 may obtain other data, such as location data generated by location sensors (e.g., GPS sensors) may also be used to determine the auditory intent of user 104. For example, auditory intent unit 402 may receive location data that indicates user 104 is in a café and may determine that user 104 repeatedly visits the café to engage in conversation. In this example, auditory intent unit 402 may determine the auditory intent for user 104 is for conversational listening when user 104 visits the café. As another example, auditory intent unit 402 may also receive application data generated by a calendar application that indicates user 104 is scheduled to meet at the café with another person at a particular time. In this example, auditory intent unit 402 may determine the auditory intent for user 104 is for conversational listening when user 104 visits the café at the particular time.

Action unit 406 may associate one or more actions to adjust the volume controls of one or more hearing instruments 102 with the auditory intent of conversational listening in a noisy environment. In this way, action unit 406 may to invoke the one or more actions (e.g., generating a notification for user 104 or generating instructions to cause one or more processors of hearing instruments 102) to adjust the volume controls of one or more hearing instruments 102 in response to receiving subsequent user data associated with user 104 (e.g., user 104's own voice and environment voice detected in a noisy environment (SPN)) and determining, based on the subsequent user data, the auditory intent of user 104 is to have a conversation in a noisy environment.

Figure 8:
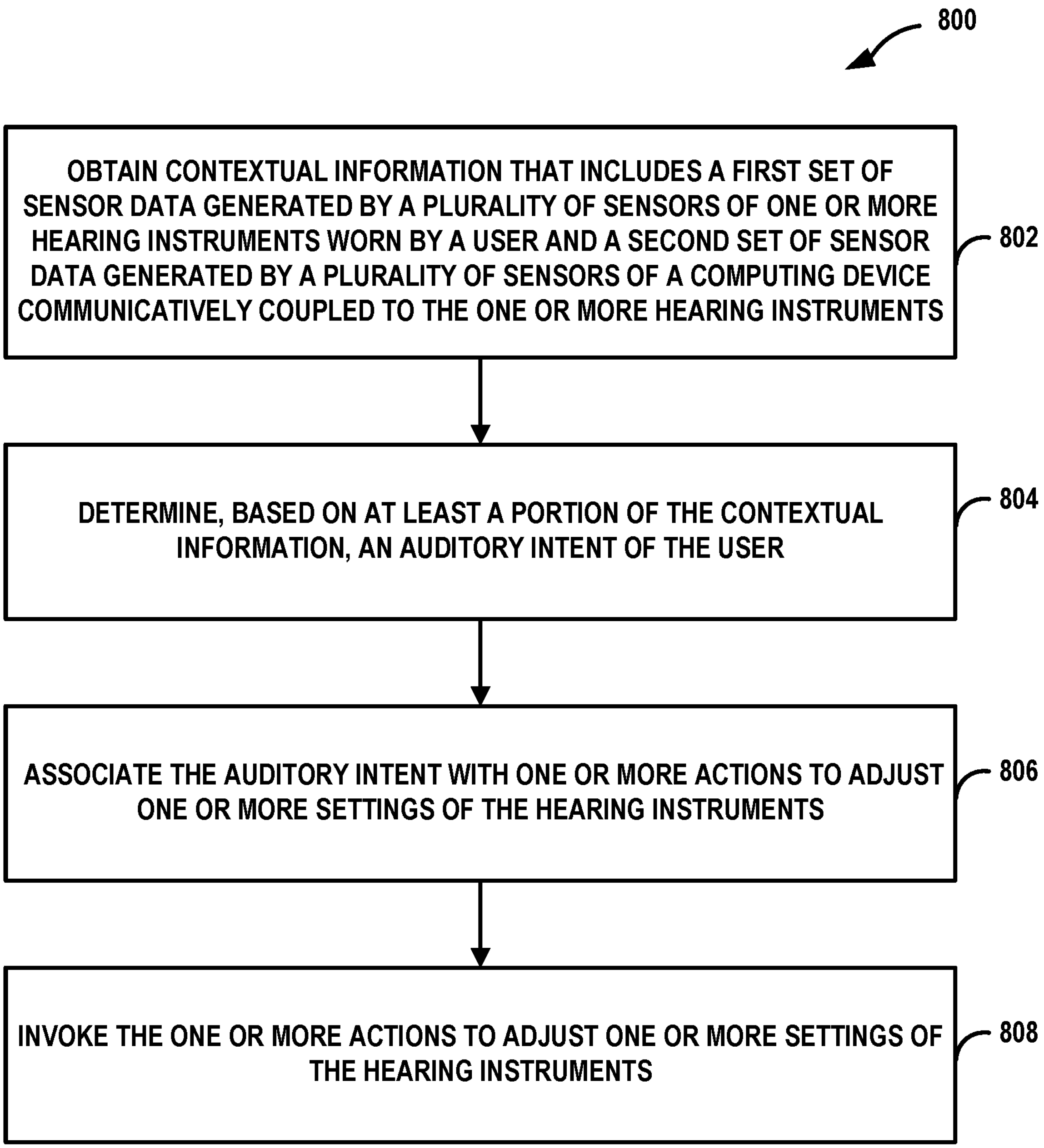
FIG. 8 is a flowchart illustrating an example operation in accordance with one or more techniques described in this disclosure.

FIG. 8 is a flowchart illustrating an example operation 800 in accordance with one or more techniques of this disclosure. Other examples of this disclosure may include more, fewer, or different actions. In some examples, actions in the flowcharts of this disclosure may be performed in parallel or in different orders.

In the example of FIG. 8, processing system 116 (which may include one or more processing circuits of one or more processors 208 of hearing instruments 102 and/or one or more processors 302 of computing device 300) may obtain contextual information associated with user 104 (802). The context information may be based on a first set of sensor data generated by a plurality of sensors 212 of one or more hearing instruments 102 and/or a second set of sensor data generated by a plurality of sensors 350 of computing device 300. For example, sensors 212 of hearing instruments 102 may produce a stream of sensor data indicative of the context of user 104 in real time, such as sensor data indicative of the surrounding environment of user 104, sensor data indicative of the motion or activity state of user 104, sensor data indicative of the physiological condition of user 104, and the like. Similarly, sensors 350 of computing device 300 may produce a stream of sensor data indicative of the context of user 104 in real time, such as sensor data indicative of the location of user 104, sensor data indicative of audio or video streaming via computing device 300, time data, and the like. In some examples, the context information may include or may be based on application data generated by one or more application modules 322 of computing device 300.

Processing system 116 may determine, based on at least a portion of the context information, an auditory intent of user 104 for a given auditory context (804). For example, processing system 116 may use at least a portion of the context information, such as the location of user 104, the activity state of user 104, the heart rate of user 104, audio streamed from one or more microphones 210 of one or more hearing instruments 102, and the like, to determine the auditory intent of user 104 for the given auditory context.

Processing system 116 may associate the auditory intent of user 104 with one or more actions (806). For example, processing system 116 may associate the auditory intent of user 104 with actions to adjust one or more settings of hearing instruments 102. In some examples, as part of associating the auditory intent of user 104 with one or more actions, processing system 116 may maintain a system response history that records actions that user 104 performs while in the given auditory context. For example, processing system 116 may determine that user 104 has a particular auditory intent and perform one or more actions associated with the particular auditory intent. In this example, if processing system 116 receives an indication of user input to change an output setting of hearing instruments 102, processing system 116 may update the set of actions associated with the particular auditory intent to change the output setting of hearing instruments 102 as indicated by user 104.

Subsequently, if processing system 116 again determines that user 104 has the same auditory intent, processing system 116 may invoke the one or more actions associated with the auditory intent of user 104. For instance, processing system 116 may automatically adjust one or more settings of hearing instruments 102. In other examples, processing system 116 may cause display screen 312, an audio output component of computing device 300, or an audio output component of one or more of hearing instruments 102 (e.g., speaker 108) to output the notification. The notification may prompt user 104 to adjust one or more settings of hearing instruments 102. In some examples, processing system 116 may use at least a portion of the sensor data to determine a time period at which user 104 is available to interact with the notification.

In this disclosure, ordinal terms such as "first," "second," "third," and so on, are not necessarily indicators of positions within an order, but rather may be used to distinguish different instances of the same thing. Examples provided in this disclosure may be used together, separately, or in various combinations. Furthermore, with respect to examples that involve personal data regarding a user, it may be required that such personal data only be used with the permission of the user.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media may include RAM, ROM, EEPROM, CD-ROM or other optical disk storage, magnetic disk storage, or other magnetic storage devices, flash memory, cache memory, or any other medium that can be used to store desired program code in the form of instructions or store data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:

1. A method comprising:

obtaining, by one or more processing circuits, context information associated with a user of one or more hearing instruments, wherein the context information is based on a first set of sensor data generated by a plurality of sensors of the one or more hearing instruments, a second set of sensor data generated by a plurality of sensors of a computing device communicatively coupled to the one or more hearing instruments, and application data generated by one or more applications executed on the computing device, wherein the application data comprises an indication of a scheduled activity of the user;

determining, by the one or more processing circuits and based on at least a portion of the context information, an auditory intent of the user for a given auditory context;

associating, by the one or more processing circuits, the auditory intent with one or more actions; and invoking, by the one or more processing circuits, the one or more actions associated with the auditory intent.

2. The method of claim 1, further comprising:

obtaining, by the one or more processing circuits, data indicating one or more user inputs by the user to adjust one or more settings of the one or more hearing instruments, wherein associating the auditory intent of the user with the one or more actions comprises associating the auditory intent of the user with at least one user input of the one or more user inputs by the user to adjust the one or more settings of the one or more hearing instruments.

3. The method of claim 1, wherein determining the auditory intent of the user comprises applying, by the one or more processing circuits, a machine learning model to determine the auditory intent of the user based on at least a portion of the context information.

4. The method of claim 1, wherein the one or more actions associated with the auditory intent include actions to adjust one or more settings of the one or more hearing instruments.

5. The method of claim 1, wherein:

the one or more actions associated with the auditory intent include a notification to the user to adjust one or more settings of the one or more hearing instruments, and invoking the one or more actions associated with the auditory intent comprises outputting the notification.

6. The method of claim 5, wherein outputting the notification comprises:

determining, by the one or more processing circuits, a time period at which the user is available to interact with the notification; and outputting, by the one or more processing circuits and during the time period, the notification to the user.

7. The method of claim 1, wherein the plurality of sensors of the one or more hearing instruments or the plurality of sensors of the computing device includes one or more location sensors, one or more motion sensors, one or more physiological sensors, and one or more microphones.

8. The method of claim 1, wherein the context information includes one or more of environmental information about a surrounding environment of the user, motion information associated with the user, or physiological information associated with the user.

9. A system comprising:

memory; and one or more processing circuits operably coupled to the memory and configured to:

obtain context information associated with a user of one or more hearing instruments, wherein the context information is based on a first set of sensor data generated by a plurality of sensors of the one or more hearing instruments, a second set of sensor data generated by a plurality of sensors of a computing device communicatively coupled to the one or more hearing instruments, and application data generated by one or more applications executed on the computing device, wherein the application data comprises an indication of a scheduled activity of the user;

determine, based on at least a portion of the context information, an auditory intent of the user for a given auditory context;

associate the auditory intent with one or more actions; and invoke the one or more actions associated with the auditory intent.

10. The system of claim 9, wherein the one or more processing circuits are further configured to:

obtain data indicating one or more user inputs by the user to adjust one or more settings of the one or more hearing instruments, and associate the auditory intent of the user with the user inputs by the user to adjust the one or more settings of the one or more hearing instruments.

11. The system of claim 9, wherein the one or more processing circuits are further configured to, as part of determining the auditory intent of the user:

apply a machine learning model to determine the auditory intent of the user based on the context information.

12. The system of claim 9, wherein the one or more actions associated with the auditory intent include actions to adjust one or more settings of the one or more hearing instruments.

13. The system of claim 9, wherein the one or more actions associated with the auditory intent include a notification to the user to adjust one or more settings of the one or more hearing instruments, and wherein the one or more processing circuits are configured to, as part of invoking the one or more actions associated with the auditory intent, output the notification.

14. The system of claim 13, wherein the one or more processing circuits are further configured to, as part of outputting the notification:

determine a time period at which the user is available to interact with the notification; and output, during the time period, the notification to the user.

15. The system of claim 9, wherein the plurality of sensors of the one or more hearing instruments or the plurality of sensors of the computing device includes one or more location sensors, one or more motion sensors, one or more physiological sensors, and one or more microphones.

16. The system of claim 9, wherein the context information includes one or more of environmental information about a surrounding environment of the user, motion information associated with the user, or physiological information associated with the user.

17. The system of claim 9, wherein the computing device comprises at least one of a smart phone, a wearable device, or an Internet of Things (IoT) device.

18. One or more non-transitory computer-readable media comprising instructions that, when executed, cause one or more processors to:

obtain context information associated with a user of one or more hearing instruments, wherein the context information is based on a first set of sensor data generated by a plurality of sensors of the one or more hearing instruments, a second set of sensor data generated by a plurality of sensors of a computing device communicatively coupled to the one or more hearing instruments, and application data generated by one or more applications executed on the computing device, wherein the application data comprises an indication of a scheduled activity of the user;

determine, based on at least a portion of the sensor data, an auditory intent of the user for a given auditory context;

associate the auditory intent with one or more actions; and invoke the one or more actions associated with the auditory intent.

* * * * *